(12) United States Patent
Takeuchi

(10) Patent No.: US 7,362,509 B2
(45) Date of Patent: Apr. 22, 2008

(54) ZOOM LENS

(75) Inventor: Hotaka Takeuchi, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 63 days.

(21) Appl. No.: 11/116,016

(22) Filed: Apr. 27, 2005

(65) Prior Publication Data

US 2005/0248854 A1 Nov. 10, 2005

(30) Foreign Application Priority Data

May 6, 2004 (JP) ............................. 2004-137028

(51) Int. Cl.
*G02B 15/14* (2006.01)
(52) U.S. Cl. ...................... 359/679; 359/680; 359/682; 359/683; 359/691; 359/713; 359/717; 359/749; 359/753; 359/761; 359/793
(58) Field of Classification Search ........ 359/679–680, 359/682, 683, 691, 717, 713, 749, 753, 761, 359/793
See application file for complete search history.

(56) References Cited

U.S. PATENT DOCUMENTS

| 5,696,633 | A | 12/1997 | Nakajima | |
|---|---|---|---|---|
| 6,487,024 | B2* | 11/2002 | Sato | ............................ 359/691 |
| 6,618,558 | B2 | 9/2003 | Enomoto | |
| 2002/0149857 | A1* | 10/2002 | Nobe | ........................ 359/676 |
| 2003/0138245 | A1 | 7/2003 | Watanabe | |
| 2003/0165019 | A1 | 9/2003 | Yamamoto | |
| 2005/0063070 | A1* | 3/2005 | Watanabe et al. | ........... 359/689 |

FOREIGN PATENT DOCUMENTS

| JP | 2000-035537 | 2/2000 |
|---|---|---|
| JP | 2003-307676 | 10/2003 |

OTHER PUBLICATIONS

Examination Report for European Patent Application No. 05 009 290.7 dated Dec. 15, 2005.

* cited by examiner

*Primary Examiner*—Evelyn A. Lester
(74) *Attorney, Agent, or Firm*—Darby & Darby P.C.

(57) ABSTRACT

A zoom lens includes, in sequence from the object side: a first lens group with an overall negative refractive power; and a second lens group with an overall positive refractive power. A zoom factor changes by moving the second lens group. Focal adjustments are made by moving the first lens group accompanied by the change of the zoom factor made by the movement of the second lens group. The first lens group includes a first lens having a negative refractive power and a second lens having a positive refractive power. The second lens group includes a third lens having a positive refractive power, a fourth lens with a positive refractive power and a fifth lens with a negative refractive power bonded together, and a sixth lens with a positive refractive power. The bonded lenses form a meniscus shape with a convex surface facing the object side. The resulting lens is short in length, compact, thin, and suitable for digital still cameras.

19 Claims, 15 Drawing Sheets

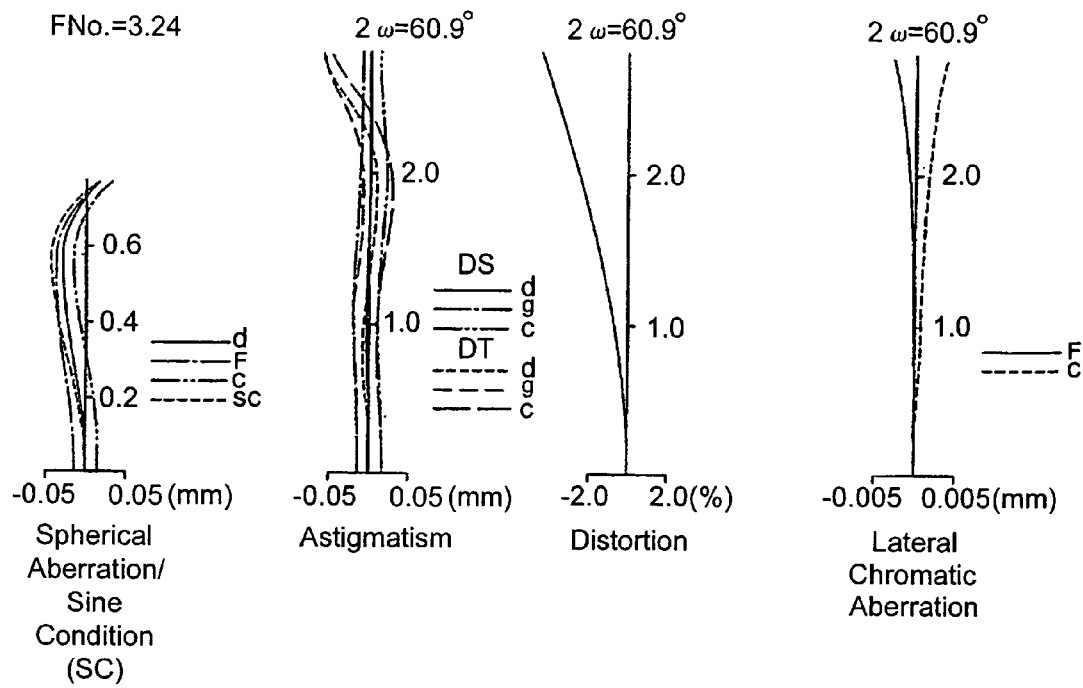
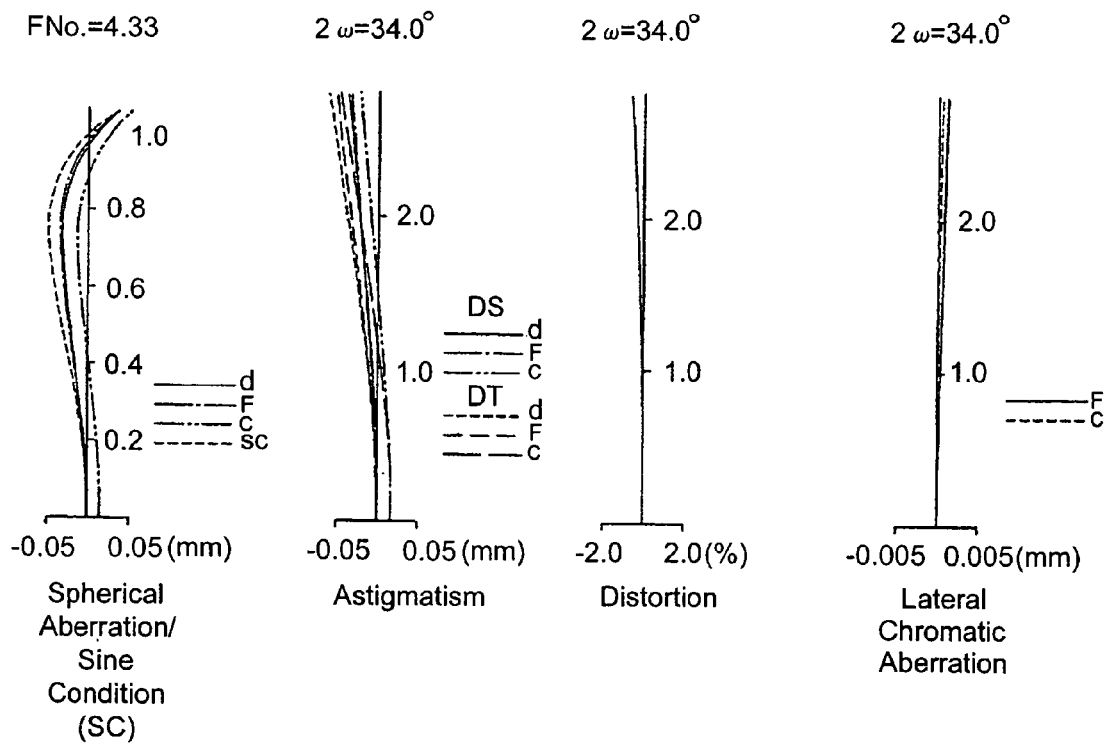

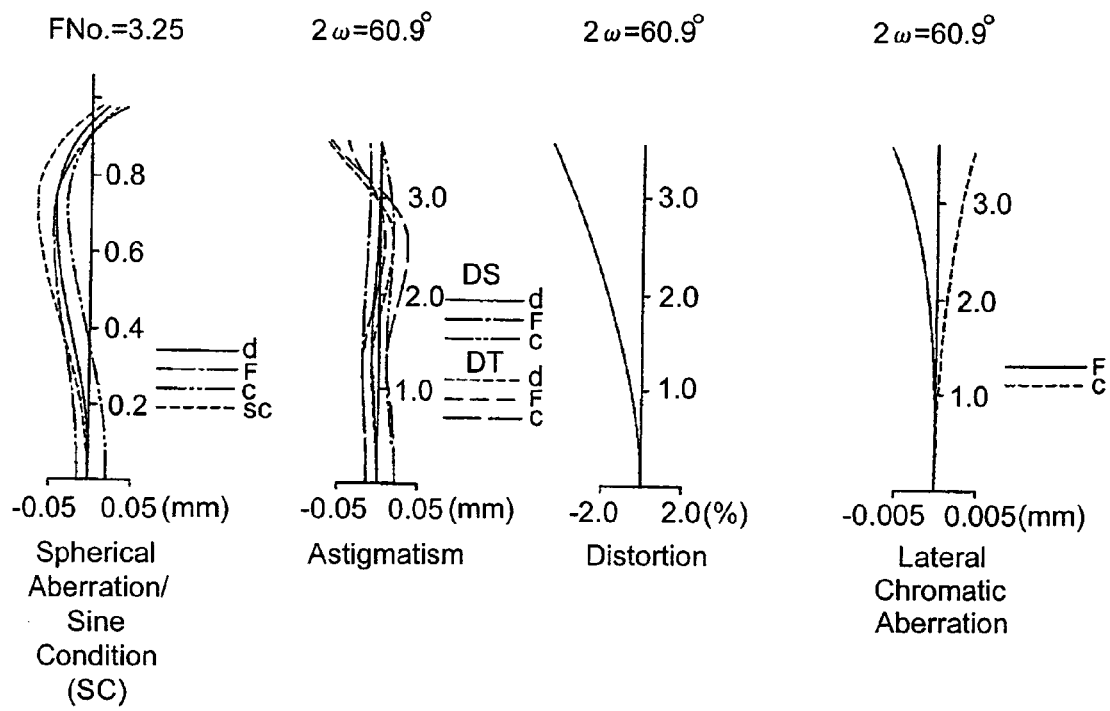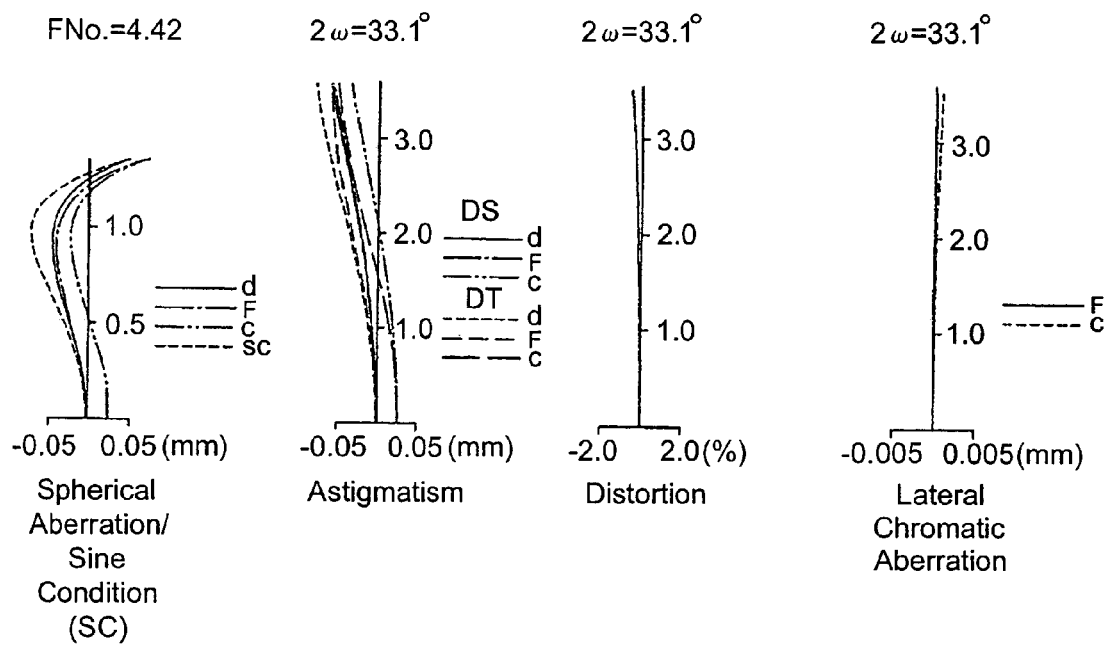

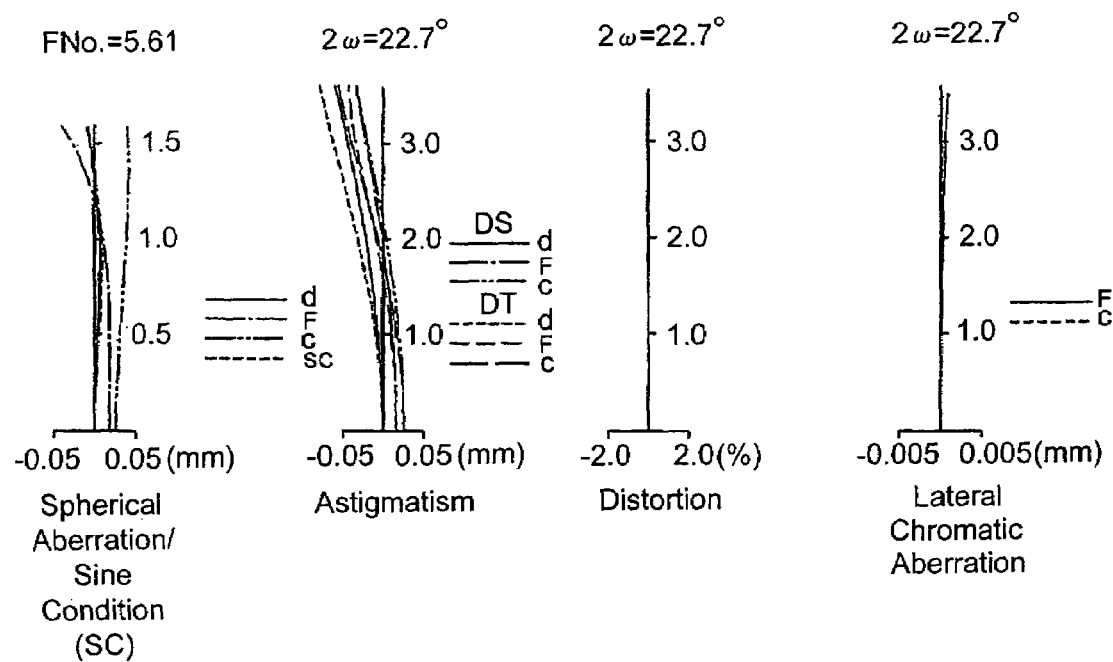
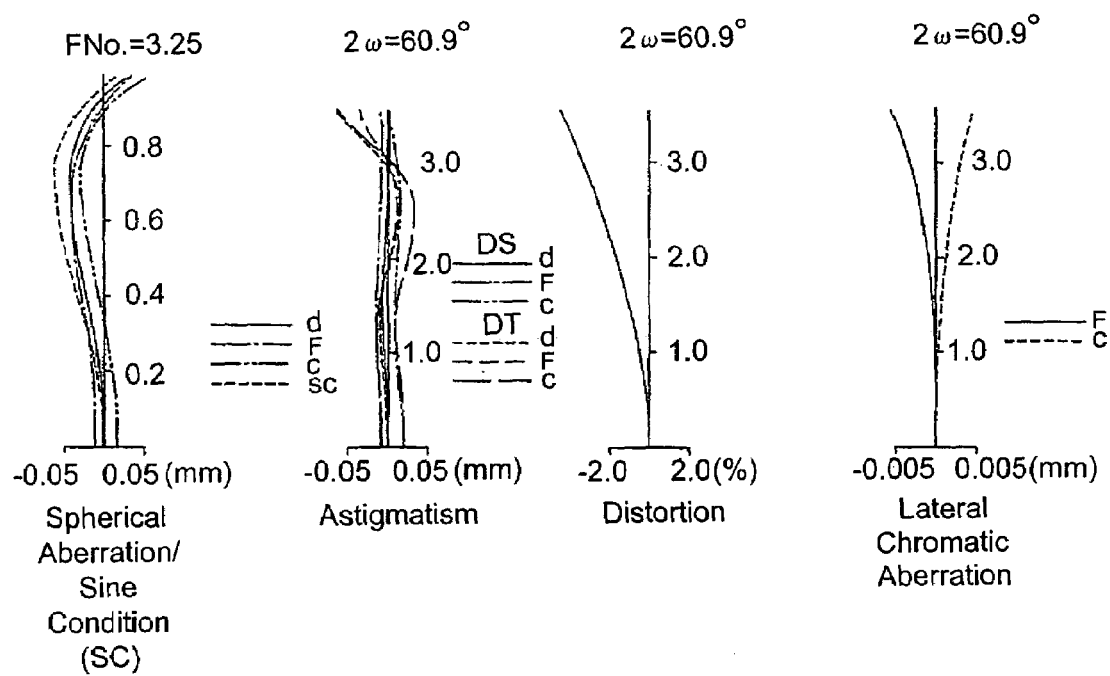

ZOOM LENS

The present application claims priority under 35 U.S.C. §119 to Japanese Patent Application No. 2004-137028 filed on May 6, 2004. The content of the application is incorporated herein by reference in its entirety.

BACKGROUND OF THE INVENTION

The present invention relates to a compact zoom lens suited for video cameras, digital still cameras equipped with a solid-state imaging element such as a CCD. More specifically, the present invention relates to a compact zoom lens suited for video cameras and digital still cameras equipped with a solid-state imaging element with a high pixel count.

In recent years, there have been significant technical advances in solid-state imaging elements such as CCDs used in digital still cameras and video cameras, resulting in higher densities and increased pixel counts. Accompanying this, there is a demand for lenses with superior optical properties. Also, with the increased compactness of digital still cameras and video cameras, there is a strong demand for zoom lenses mounted on these devices for imaging to be compact and light-weight.

In order to provide good portability, the need for compactness especially involves shortening of the lens when the device is being carried, i.e., the lens can be thinner when stored.

In order to make efficient use of light, microlenses are formed on the surface of the solid-state imaging element such as the CCD. As a result, if the angle of incidence of light to the solid-state imaging element is too high, vignetting (so-called "shading") can take place, resulting in light not entering into the solid-state imaging element. As a result, the lenses used with the solid-state imaging element is desired to be positioned so that the exit pupil can keep an adequate distance from the image plane and a telecentric optical system, in which the incident angle to the solid-state imaging element, i.e., the exit angle, can be kept small. With improvements in microlenses that have accompanied with the technical advances of recent years, incident angles of up to around 15 degrees can be used with no problems.

For conventional zoom lenses with zoom factors of about 2 or 3, many examples of zoom lenses, such as those mounted on a compact camera, have been disclosed where two lens groups are used (e.g., see Japanese Laid-Open Patent Document Number 2003-075721 and Japanese Laid-Open Patent Document Number 2003-307676). These zoom lenses are so-called telephoto-type two-group zoom lenses formed from a first lens group having a positive refractive power and a second lens group having a negative refractive power. This design is advantageous in a point that it allows the lens to be thinner when stored.

However, in this type of arrangement with a first lens group having a positive refractive power and a second lens group having a negative refractive power, the exit angle of the outermost light rays becomes too large especially at the wide-angle end. As a result, using this design for solid-state imaging elements such as CCDs is extremely difficult.

In another known arrangement, a zoom lens with a two-group structure includes, going from the object side to the image plane side, a first lens group having an overall negative refractive power, and a second lens group having an overall positive refractive power (e.g., see Japanese Laid-Open Patent Document Number 3000-035537).

However, since the first lens group is formed from four lenses having a positive refractive power, a negative refractive power, a negative refractive power, and a positive refractive power, the total length of the camera is long when it is stored (retracted). Also, since the lens furthest to the object side has a positive refractive power, even it is effective for distortion correction, this results in providing a large outer diameter for the lens furthest to the object side, making a thinner, more compact design difficult.

With two-group zoom lenses such as those described above, the exit angle of the outermost rays, especially at the wide-angle end, becomes large, which prevents telecentricity and these structures from being used in recent solid-state imaging elements with high pixel counts. Also, with conventional two-group zoom lenses, the first lens group is formed from a large number of lenses which increases the number of parts. This makes it difficult to achieve a compact, light-weight design. In particular, a thin design cannot be achieved when the camera is stored.

The above, and other objects, features and advantages of the present invention will become apparent from the following description read in conjunction with the accompanying drawings, in which like reference numerals designate the same elements.

SUMMARY OF THE INVENTION

The present invention overcomes these problems and provides a light and compact zoom lens that is suited for recent solid-state imaging elements with high pixel counts, that provides a thin design especially when the camera is stored, and that provides superior optical properties with effective correction of various aberrations. To say further, an object of the present invention is to provide a thin, compact zoom lens suitable for solid-state imaging elements with high pixel counts that meets the conditions follow: a zoom factor of about 2.5-3 times; a total length for the lens system of 35 mm or less when imaging (from the front surface of the first lens group to the image plane); a total thickness for the lens groups along the optical axis (thickness of first lens group+thickness of second lens group) that is 12 mm or less; a back focus of at least 5 mm to allow placement of a low-pass filter; a lens brightness (F number) at the wide-angle end of approximately 3.2; and a distortion of |15%| or less.

A zoom lens of the present invention includes, in sequence from an object side to an image plane side, a first lens group having an overall negative refractive power and a second lens group having an overall positive refractive power, wherein a zoom factor is changed from a wide-angle end to a telescopic end by moving the second lens group from the image plane side to the object side, and focal adjustment is performed by moving the first lens group to correct changes in the image plane accompanied by changes in the zoom factor. The first lens group includes, in sequence from the object side, a first lens having a negative refractive power and a second lens having a positive refractive power. The second lens group includes, in sequence from the object side, a third lens having a positive refractive power, a fourth lens having a positive refractive power and a fifth lens having a negative refractive power bonded together to be formed in a meniscus shape with a convex surface facing the object side and having an overall negative refractive power, and a sixth lens having a positive refractive power. With this structure, the two lens groups with six lenses are provided, which allow effective optical properties, reduce the total length, reduce the size when the camera is stored (retracted), and provide a thin, compact design.

According to the structure described above, conditions (1) and (2) below are met:

$$0.5 < |f2/f1| < 1.3 \quad (1)$$

$$1.25 < |f1|/fw < 2.5 \quad (2)$$

wherein f1 is a focal length of the first lens group, f2 is a focal length of the second lens group, and fw is a focal length of the entire lens system at the wide-angle end. With this structure, different zoom factors, particularly factors of approximately 2.5-3 times, can be achieved, superior optical properties can be obtained with effective corrections of distortion, lateral chromatic aberration, spherical aberration, and astigmatism, adequate telecentricity can be provided, and a compact, thin design can be provided.

According to the structure described above, conditions (3) and (4) below are met:

$$v4 > v5 \quad (3)$$

$$1.0 < R7/R9 < 3.0 \quad (4)$$

wherein v4 is an Abbe number of the fourth lens, v5 is an Abbe number of the fifth lens, R7 is a curvature radius of an object-side surface of the fourth lens, and R9 is a curvature radius of an image plane side surface of the fifth lens. With this structure, various types of aberration, especially chromatic aberration and spherical aberration, can be effectively corrected.

According to the structure described above, conditions (5) and (6) below are met:

$$v1 - v2 > 10 \quad (5)$$

$$D2/fw > 0.2 \quad (6)$$

wherein v1 is an Abbe number of the first lens, v2 is an Abbe number of the second lens, D2 is a distance along an optical axis between the first lens and the second lens, and fw is a focal length of the entire lens system at the wide-angle end. With this structure, various types of aberrations, especially chromatic aberration and spherical aberration, can be effectively corrected.

According to the structure described above, each of the first lens, the third lens, and the sixth lens is formed with an aspherical surface on the object-side and/or the image plane side surface. With this structure, an aspherical surface on the first lens provides effective correction of distortion and astigmatism, an aspherical surface on the third lens provides effective correction of spherical aberration, and an aspherical surface on the sixth lens provides effective correction of astigmatism and coma aberration. As a result, various types of aberrations are effectively corrected overall.

According to the structure described above, the first lens has an aspherical surface on a surface with a smaller curvature radius. With this structure, various types of aberrations, especially distortion and astigmatism, can be effectively corrected.

According to the structure described above, the aspherical surface on the first lens is shaped so that a negative refractive power decreases toward edge portions. With this structure, various types of aberrations, especially distortion and astigmatism, can be effectively corrected.

According to the structure described above, the first lens is a hybrid lens formed by bonding a resin layer made of a resin material to a glass lens with the aspherical surface being formed on the resin layer.

If the first lens with an aspherical surface is formed using only a glass material or resin material, e.g., plastic, the type of glass material or resin material that can be used will be limited. With this structure, however, by applying a resin layer on the glass lens and forming an aspherical surface on the resin layer, different types of glass material can be used for the glass lens serving as the base. This provides further cost reductions while providing more effective correction of color aberrations.

According to the structure described above, the resin layer is bonded to a surface of the first lens with a smaller curvature radius. With this structure, various types of aberrations, especially distortion and astigmatism, can be effectively corrected.

According to the structure described above, the aspherical surface formed on the resin layer is shaped so that a negative index of refraction decreases toward edge portions. With this structure, various types of aberrations, especially distortion and astigmatism, can be effectively corrected.

According to the structure described above, in the first lens, condition (7) below is met:

$$1 < |R2a/R2| < 1.5 \quad (7)$$

where R2a is a curvature radius of the surface at which the glass lens and the resin layer are bonded, and R2 is a curvature radius of the surface on which the aspherical surface is formed. With this structure, the shape of the resin layer on the first lens prevents changes caused by temperature changes and moisture absorption and the like while allowing the aspherical surface to be formed with high precision. Also, various types of aberrations are effectively corrected and productivity can be improved.

According to the structure described above, the third lens is formed by bonding a resin layer formed from a resin material to a glass lens, with the aspherical surface being formed on the resin layer.

If the third lens with an aspherical surface is formed using only a glass material or resin material, e.g., plastic, the type of glass material or resin material that can be used will be limited. With this structure, however, by applying a resin layer on the glass lens and forming an aspherical surface on the resin layer, different types of glass material can be used for the glass lens serving as the base. This provides further cost reductions while providing more effective correction of color aberrations.

According to the structure described above, the resin layer is bonded on a surface of the third lens with a smaller curvature radius. With this structure, various types of aberrations, especially spherical aberration, can be effectively corrected.

According to the structure described above, the aspherical surface formed on the resin layer is shaped so that a positive refractive power decreases toward edge portions. With this structure, various types of aberrations, especially spherical aberration, can be effectively corrected.

According to the structure described above, in the third lens, condition (8) below is met:

$$0.7 < |R5a/R5| < 2.0 \quad (8)$$

where R5a is a curvature radius of a surface at which the glass lens and the resin layer are bonded, and R5 is a curvature radius of the surface on which the aspherical surface is formed. With this structure, the shape of the resin layer on the third lens is prevented from changing due to temperature changes or moisture absorption and the like. This allows the aspherical surface to be formed with high precision, the various aberrations to be effectively corrected, and productivity to be improved.

According to the structure described above, the sixth lens is a hybrid lens formed by bonding a resin layer formed from a resin material to a glass lens, wherein the aspherical surface is formed on the resin layer.

If the sixth lens with an aspherical surface is formed using only a glass material or resin material, e.g., plastic, the type of glass material or resin material that can be used will be limited. With this structure, however, by applying a resin layer on the glass lens and forming an aspherical surface on the resin layer, different types of glass material can be used for the glass lens serving as the base. This provides further cost reductions while providing more effective correction of color aberrations.

According to the structure described above, the aspherical surface formed on the resin layer is shaped so that a positive refractive power decreases toward edge portions. With this structure, various types of aberration, especially astigmatism and coma aberration, can be effectively corrected.

According to the structure described above, in the sixth lens, condition (9) below is met:

$$0.5 < |R11a/R11| 2.0 \qquad (9)$$

where R11$a$ is a curvature radius of a surface at which the glass lens and the resin layer are bonded, and R11 is a curvature radius of the surface on which the aspherical surface is formed. With this structure, the shape of the resin layer on the sixth lens is prevented from changing due to temperature changes and moisture absorption and the like. This allows the aspherical surface to be formed with high precision, the various aberrations to be effectively corrected, and productivity to be improved.

With a zoom lens according to the present invention having the structure described above, the design can be made more compact, thinner, lighter, and less expensive, and a zoom lens with superior optical properties can be provided with effective correction of various types of aberration.

In particular, a zoom lens suited for imaging elements with high pixel counts can be provided with a zoom factor of approximately 2.5-3 times. Because the total length of the lens system (front surface of the first lens group—image plane) during imaging is 35 mm or less, a compact design can be provided. And for the total dimension along the optical axis of the lens groups (thickness of the first lens group+thickness of the second lens group) is 12 mm or less, the device can be made more compact and thinner when stored. Since the back focus is 5 mm or more, a low-pass filter can be easily placed. An F number at the wide-angle end provides brightness of 3.2. Superior optical properties are provided to the zoom lens suitable for imagining elements with high pixel counts, with effective correction of various types of aberrations and distortion of less than |15% |.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which:

FIG. 2 shows aberration diagrams for spherical aberration, astigmatism, distortion, and lateral chromatic aberration at the wide-angle end of a zoom lens according to the first embodiment;

FIG. 3 shows aberration diagrams for spherical aberration, astigmatism, distortion, and lateral chromatic aberration at the middle position of a zoom lens according to the first embodiment;

FIG. 10 shows aberration diagrams for spherical aberration, astigmatism, distortion, and lateral chromatic aberration at the wide-angle end of a zoom lens according to the third embodiment;

FIG. 11 shows aberration diagrams for spherical aberration, astigmatism, distortion, and lateral chromatic aberration at the middle position of a zoom lens according to the third embodiment;

FIG. 12 shows aberration diagrams for spherical aberration, astigmatism, distortion, and lateral chromatic aberration at the telescopic end of a zoom lens according to the third embodiment;

FIG. 14 shows aberration diagrams for spherical aberration, astigmatism, distortion, and lateral chromatic aberration at the wide-angle end of a zoom lens according to the fourth embodiment;

DETAILED DESCRIPTION OF THE PREFERRED EMBODIMENTS

The preferred embodiments of the present invention will be described, with references to the attached drawings.

Figure 1:
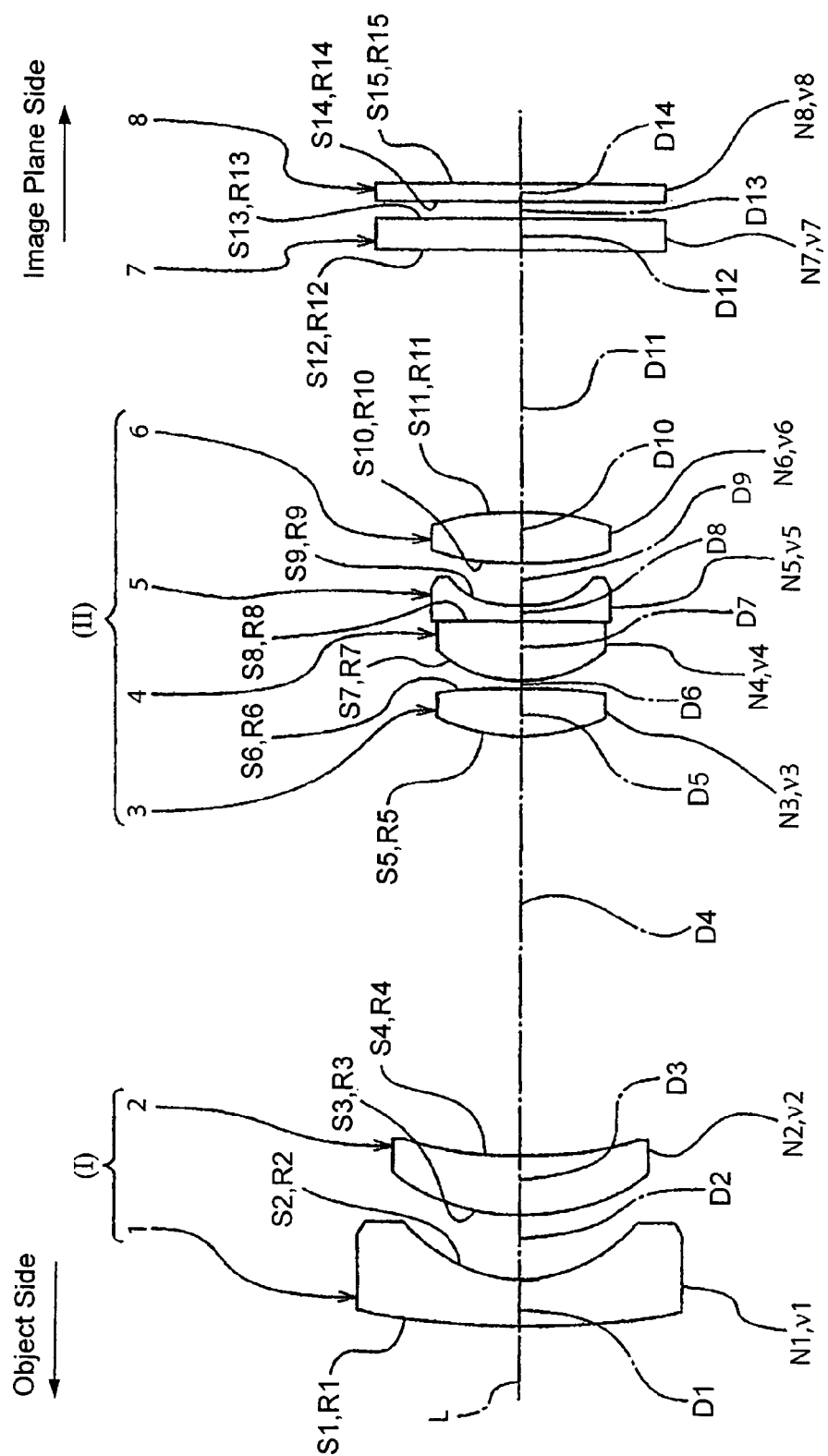
FIG. 1 is a drawing showing the structure of a first embodiment of a zoom lens according to the present invention.

FIG. 1 shows the basic structure of an embodiment of a zoom lens according to the present invention. As FIG. 1 shows, the following elements are arranged in sequence, going from the object side to the image plane side: a first lens group I having an overall index of negative refractive power; and a second lens group II having an overall positive refractive power.

Starting in sequence from the object side, the first lens group I is formed from a first lens 1 having a negative refractive power and a second lens 2 having a positive refractive power.

Starting in sequence from the object side, the second lens group II is formed from: a third lens 3 having a positive refractive power; a fourth lens 4 having a positive refractive power and a fifth lens 5 having a negative refractive power bonded together so that the overall refractive power is negative, both lenses being formed with meniscus shapes with convex surfaces facing the object side; and a sixth lens 6 having a positive refractive power.

According to the structure described above glass fibers 7, 8, e.g., an IR cut filter and a low-pass filter and the like, are disposed to the image plane side of the second lens group II (the sixth lens 6). A shutter (not shown in the figure) that opens and closes the light path is interposed between the second lens group II (the sixth lens 6) and the glass filter 7. An aperture stop is defined at the outer edge of the side furthest to the object side of the support frame supporting the second lens group II, i.e., around the third lens 3.

According to the structure described above, the zoom factor is varied from a wide-angle end to a telescopic end by moving the second lens group II along an optical axis L from the image plane side to the object side. The first lens group I corrects the change in the image that accompanied by changes in the zoom factor and provides focus adjustment (focusing).

Because the zoom lens is formed in this manner from two lens groups I, II and the six lenses 1-6, effective optical properties can be obtained while the total length can be reduced, the size when the camera is stored (retracted) can be reduced, and a thin, compact design can be achieved.

The first lens group I has a focal length f1, the second lens group II has a focal length f2, the entire lens system at the wide-angle end has a focal length fw, the entire lens system at the telescopic end has a focal length ft, and the entire lens system in the middle region has a focal length fm.

As shown in FIG. 1, with the first lens 1 through the sixth lens 6 and the glass filters 7, 8, the respective surfaces facing the object side and image side are labeled Si (i=1-15), and the curvature radius of each surface S1 is labeled R1 (i=1-15). The index of refraction relative to the line d is labeled Ni and the Abbe number is labeled vi (i=1-8).

Furthermore, the distances (thickness, air distance) from the first lens 1 through the glass filter 8 along the optical axis L are labeled Di (i=1-14), and the back focus is labeled BF.

The first lens 1 has a negative refractive power and is formed as a meniscus shape with a convex surface on the object-side surface S1 and a concave surface on the image plane side surface S2 using a glass material. The surface S2 with the small curvature radius is formed as an aspherical surface with the negative refractive power decreasing toward the edges of the aspherical surface S2. As a result, various types of aberration can be effectively corrected, especially distortion and astigmatism.

The second lens 2 has a positive refractive power and is formed as a meniscus shape using a glass material with a convex surface on the object-side surface S3 and a concave surface on the image plane side surface S4. The surfaces S3, S4 are both formed as spherical surfaces.

The third lens 3 has a positive refractive power and is formed as a biconvex shape using a glass material with convex surfaces on the object-side surface S5 and the image plane side surface S6. The object-side surface S5 is formed as an aspherical surface and the image plane side surface S6 is formed as a spherical surface. The use of the aspherical surface S5 provides effective correction especially for spherical aberration.

The fourth lens 4 has a positive refractive power and is formed as a meniscus shape using a glass material with a convex surface on the object-side surface S7 and a concave surface on the image plane side surface S8. The surfaces S7, S8 are both formed as spherical surfaces.

The fifth lens 5 has a negative refractive power and is formed as a meniscus shape using a glass material with a convex surface on the object-side surface S8 and a concave surface on the image plane side surface S9. The surfaces S8, S9 are both formed as spherical surfaces.

The fourth lens 4 and the fifth lens 5 are bonded as a cemented lens at the surface S8 which forms a single curvature radius R8 so that they all together have an overall negative refractive power and form a meniscus shape with a convex surface facing the object side.

The sixth lens 6 has a positive refractive power and is formed as a biconvex shape using a glass material with a convex surface on the object-side surface S10 and a convex surface on the image plane side surface S11. The object-side surface S10 is formed as a spherical surface and the image plane side surface S11 is formed as an aspherical surface. The aspherical surface S11 provides effective correction, especially for astigmatism and coma aberration.

The aspherical surfaces are defined by the following equation:

$$Z = Cy^2/[1+(1-\epsilon C^2 y^2)^{1/2}]Dy^4 Ey^6 + Fy^8 + Gy^{10} + Hy^{12}$$

where Z is the distance from a plane tangent at the apex of the aspherical surface to a point on the aspherical surface at a height y from the optical axis x; y is the height from the optical axis L; C is the curvature at the apex of the aspherical surface (1/R); ε is the conic constant; and D, E, F, G, H are aspherical surface coefficients.

Also, for the first lens group I and the second lens group II, the following conditions are met:

$$0.5 < |f2/|f1| < 1.3 \quad (1)$$

$$1.25 < |f1|/fw < 2.5 \quad (2)$$

where f1 is the focal length of the first lens group I, f2 is the focal length of the second lens group II, and fw is the focal length of the entire lens system at the wide-angle end.

The condition (1) sets an appropriate ratio for the focal lengths of the first lens group I and the second lens group II. If the upper limit is exceeded, aberrations become prominent, especially distortion and lateral chromatic aberration, and correction becomes difficult. If the lower limit is exceeded, achieving zoom factors of approximately 2.5-3 times becomes difficult.

The condition (2) defines the appropriate focal length for the first lens group I. If the upper limit is exceeded, the total lens length must be large to achieve zoom factors of approximately 2.5-3 times. Also, the outermost optical rays at the wide-angle end, become more distant from the optical axis L, thus increases the outer diameter of the first lens 1 and makes it difficult to achieve a thin, compact design. If the lower limit is exceeded, aberrations, especially spherical aberration and astigmatism, become difficult to correct.

Thus, by meeting conditions (1) and (2), zoom factors of approximately 2.5-3 times can be achieved, superior optical characteristics can be provided with correction of distortion, lateral chromatic aberration, spherical aberration, and astigmatism, sufficient telecentricity is achieved, and a compact, thin design can be provided.

Also, with the above structure, the bonded lens forming part of the second lens group II, i.e., the fourth lens 4 and the fifth lens 5, the Abbe number v4 of the fourth lens 4, the Abbe number v5 of the fifth lens 5, the curvature radius R7 of the object-side surface S7 of the fourth lens 4, and the curvature radius R9 of the image plane side surface S9 of the fifth lens 5 meet the following conditions (3), (4):

$$v4 > v5 \quad (3)$$

$$1.0 < R7/R9 < 3.0 \quad (4)$$

Condition (3) defines the relationship between the Abbe numbers of the fourth lens 4 and the fifth lens 5. By meeting condition (3), effective correction can be provided, especially for chromatic aberration.

Condition (4) defines the relationship between the curvature radii of both the object-side and image plane side surfaces of the bonded lens. By meeting condition (4), effective correction can be provided, especially for spherical aberration.

Also, in this structure, the first lens 1 and the second lens 2 forming the first lens group I meet the following conditions (5), (6):

$$v1 - v2 > 10 \quad (5)$$

$$D2/fw > 0.2 \quad (6)$$

where the v1 is the Abbe number of the first lens 1, v2 is the Abbe number of the second lens 2, D2 is the distance along the optical axis L between the first lens 1 and the second lens 2, and fw is the focal length of the entire lens system at the wide-angle end.

The condition (5) defines the relationship between the Abbe numbers of the first lens 1 and the second lens 2. By meeting condition (5), effective correction can be provided, especially for chromatic aberration.

The condition (6) defines the distance between the first lens 1 and the second lens 2. This provides effective correction, especially for spherical aberration.

An embodiment where specific numerical values are used for the above structure will be described below in the form of a first embodiment. For the first embodiment, the various specifications are shown in Table 1, the various numerical data (settings) are shown in Table 2, and numerical data relating to aspherical surfaces are shown in Table 3. Table 4 shows the focal lengths f of the overall lens system for the wide-angle end, the middle position, and the telescopic end (respectively, as fw, fm, ft) and numerical data for the surface distances D4, D11 along the optical axis L. In Table 1, the total length of the lens is the distance from the front surface S1 of the first lens group I to the back surface S11 of the second lens group II. The total length of the lens system is the distance from the front surface S1 of the first lens group I to the image plane (including the cover glass of the CCD) (likewise for Table 5, Table 9, Table 13, Table 17, and Table 21).

In the first embodiment, the numerical data for condition (1) through condition (6) are as follows: (1) f2/|f1|=0.828; (2) |f1|/fw=1.854; (3) v4=38.0>v5=23.8; (4) R7/R9=1.220; (5) v1−v2=17.1; and (6) D2/fw=0.321.

Figure 4:
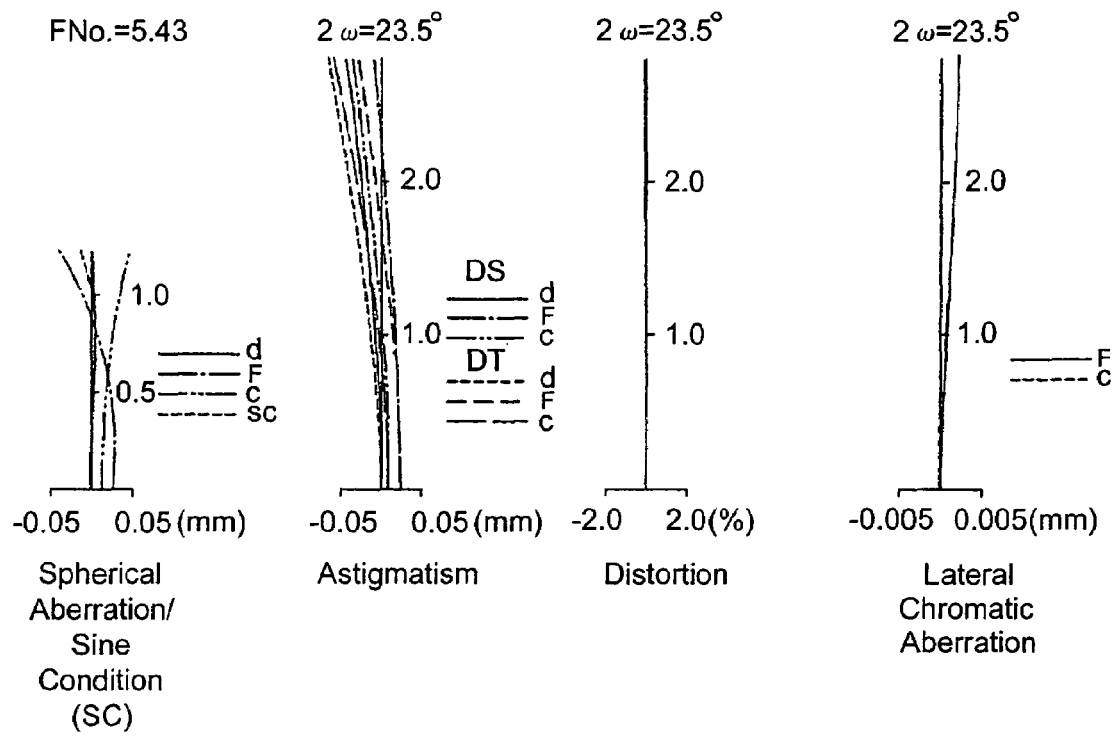
FIG. 4 shows aberration diagrams for spherical aberration, astigmatism, distortion, and lateral chromatic aberration at the telescopic end of a zoom lens according to the first embodiment.

Aberration diagrams for spherical aberration, astigmatism, distortion, and lateral chromatic aberration for the wide-angle end, the middle position, and the telescopic end are as shown in FIG. 2, FIG. 3, and FIG. 4. In FIG. 2 through FIG. 4, the aberration at the line d is indicated by d, the aberration at line F is indicated by F, the aberration at line c is indicated by c. SC indicates offense against the sine condition, DS indicates sagittal plane aberration, and DT indicates meridional plane aberration.

TABLE 1

| Object Distance (mm) | Infinity (∞) | Thickness of Second Lens Group II (mm) | 5.40 |
|---|---|---|---|
| Focal Length (mm) | 4.98~9.21~13.45 | Total Thickness of Lens Groups (mm) | 9.70 |
| F Number | 3.24~4.33~5.43 | Back Focus (Air Conversion) (mm) | 7.72~11.23~14.73 |

TABLE 1-continued

| | | | |
|---|---|---|---|
| Exit Pupil Position (mm) | −11.79~−15.29~−18.80 | Field Angle (2ω) | 60.90°~34.0°~23.5° |
| Exit Angle of Outermost Light Ray | 11.8°~11.14°~9.1° | Focal Length f1 (mm) | −9.234 |
| Total Length of Lens (mm) | 19.65~13.13~10.72 | Focal Length f2 (mm) | 7.648 |
| Total Length of Lens System (mm) | 27.81~24.80~25.90 | Focal Length fw at Wide-Angle End (mm) | 4.980 |
| Thickness of First Lens Group I (mm) | 4.30 | | |

TABLE 2

| Surface | | Curvature Radius (mm) | | Distance (mm) | | Index of Refraction (line d) | Abbe Number |
|---|---|---|---|---|---|---|---|
| S1 | R1 | 24.782 | | | | | |
| | | | D1 | 1.300 | N1 | 1.80470 v1 | 40.9 |
| S2* | R2 | 3.542 | | | | | |
| | | | D2 | 1.600 | | | |
| S3 | R3 | 5.939 | | | | | |
| | | | D3 | 1.400 | N2 | 1.84666 v2 | 23.8 |
| S4 | R4 | 10.737 | | | | | |
| | | | D4 | Variable | | | |
| S5* | R5 | 6.027 | | | | | |
| | | | D5 | 1.300 | N3 | 1.48419 v3 | 70.0 |
| S6 | R6 | −22.610 | | | | | |
| | | | D6 | 0.150 | | | |
| S7 | R7 | 3.524 | | | | | |
| | | | D7 | 1.200 | N4 | 1.60342 v4 | 38.0 |
| S8 | R8 | 10.100 | | | | | |
| | | | D8 | 0.550 | N5 | 1.84666 v5 | 23.8 |
| S9 | R9 | 2.889 | | | | | |
| | | | D9 | 0.900 | | | |
| S10 | R10 | 13.393 | | | | | |
| | | | D10 | 1.300 | N6 | 1.51450 v6 | 63.1 |
| S11* | R11 | −10.678 | | | | | |
| | | | D11 | Variable | | | |
| S12 | | ∞ | | | | | |
| | | | D12 | 0.800 | N7 | 1.51680 v7 | 64.2 |
| S13 | | ∞ | | | | | |
| | | | D13 | 0.500 | | | |
| S14 | | ∞ | | | | | |
| | | | D14 | 0.500 | N8 | 1.51680 v8 | 64.2 |
| S15 | | ∞ | | | | | |
| | | | BF | 0.500 | | | |

*Aspherical surface

TABLE 3

| Surface | Aspherical Surface Coefficient | Numerical Data |
|---|---|---|
| S2 | ε | 0.3930000 |
| | D | 0.4061610 × 10$^{-3}$ |
| | E | 0.9793810 × 10$^{-5}$ |
| | F | −0.4802350 × 10$^{-7}$ |
| | G | 0.1098130 × 10$^{-8}$ |
| | H | −0.4248720 × 10$^{-8}$ |
| S5 | ε | 1.1000000 |
| | D | −0.8107880 × 10$^{-3}$ |
| | E | −0.2869430 × 10$^{-4}$ |
| | F | −0.1585290 × 10$^{-5}$ |
| | G | −0.7433420 × 10$^{-7}$ |
| | H | 0.0 |
| S11 | ε | 1.0000000 |
| | D | 0.1980620 × 10$^{-3}$ |
| | E | 0.5208730 × 10$^{-5}$ |
| | F | 0.2156492 × 10$^{-6}$ |
| | G | 0.5215280 × 10$^{-8}$ |
| | H | 0.0 |

TABLE 4

| | Wide-Angle End | Middle Position | Telescopic End |
|---|---|---|---|
| f (mm) | 4.98 (fw) | 9.21 (fm) | 13.45 (ft) |
| D4 (mm) | 9.950 | 3.435 | 1.022 |
| D11 (mm) | 5.862 | 9.368 | 12.874 |

In the first embodiment described above: the length of the total lens system during imaging (the front surface S1 of the first lens group to the image plane) is 27.81 mm (wide-angle end)—24.80 mm (middle)—25.90 mm (telescopic end); the total dimension along the optical axis (thickness of the first lens group I+thickness of the second lens group II) is 9.70 mm; the back focus (air conversion) is 7.72 mm (wide-angle end)—11.23 mm (middle)—14.73 mm (telescopic end); the F number is 3.24 (wide-angle end)—4.33 (middle)—5.43 (telescopic end); and distortion is |5%| or less. Various types of aberrations are corrected effectively and a thin, compact zoom lens with superior optical properties suited for imaging elements with high pixel counts is provided.

Figure 5:
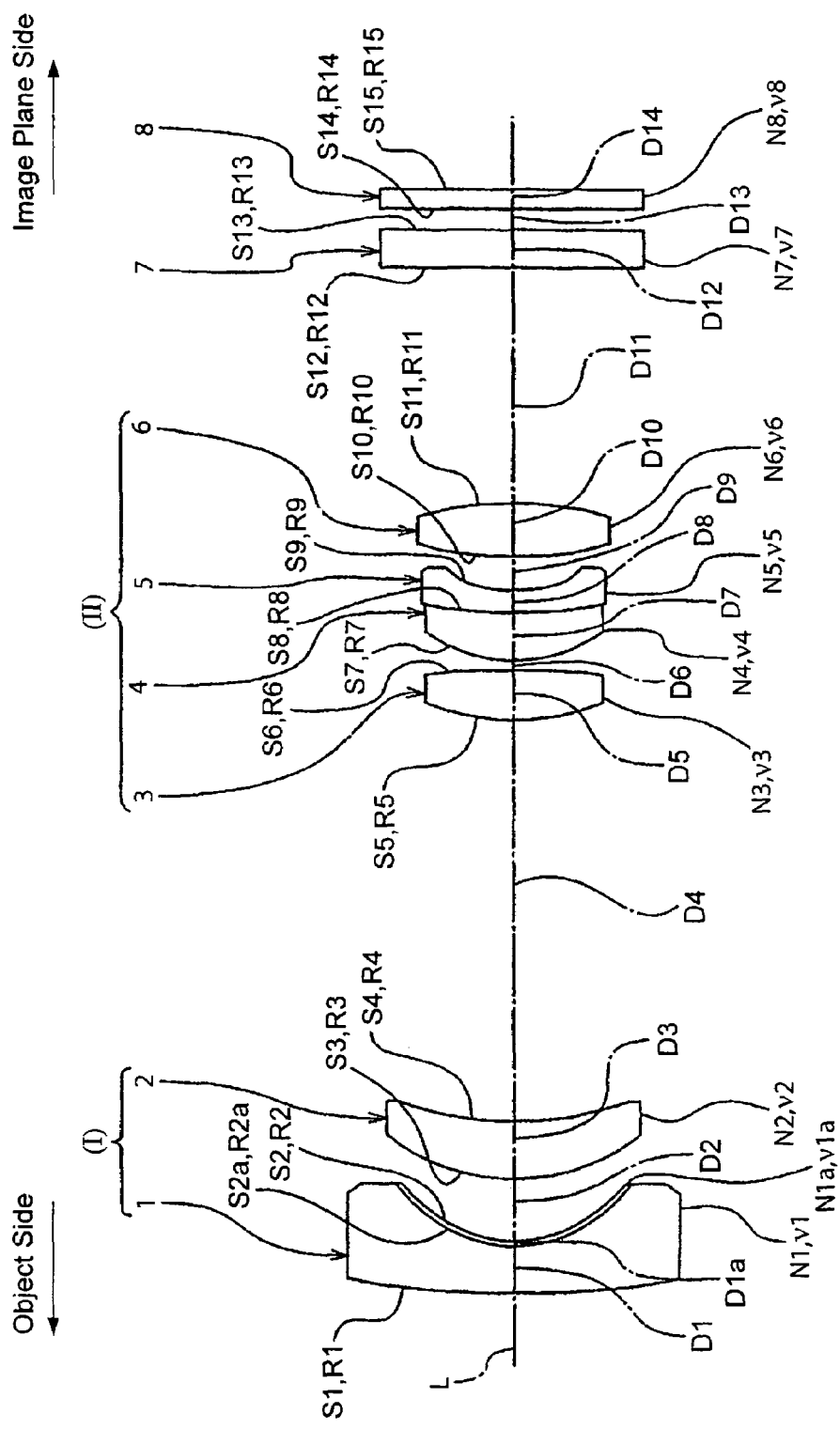
FIG. 5 is a drawing showing the structure of a second embodiment of a zoom lens according to the present invention.

FIG. 5 shows the basic structure of another embodiment of a zoom lens according to the present invention. This structure is identical to that of the embodiment shown in FIG. 1 (first embodiment) except making the first lens 1 as a hybrid lens. Structures identical to those from the first embodiment will not be described here.

As shown in FIG. 5, the first lens 1 is a hybrid lens in which a glass lens forms a meniscus shape with a convex object-side surface S1 and a concave image plane side surface S2a so that there is a negative refractive power, and a resin layer formed from a resin material is bonded to the surface S2a, which has a smaller curvature radius. The image plane side surface S2 of the resin layer forms an aspherical surface.

The resin layer has an index of refraction N1a, an Abbe number via, and a thickness D1a along the optical axis L.

If the first lens with the aspherical surface were to be formed solely from a glass material or a resin material, e.g., plastic, the type of glass material or resin material that could be used would be limited. However, by applying a resin layer to a glass lens as described above and forming the resin layer as an aspherical surface, different types of glass materials can be used for the glass lens serving as the base. Thus, costs can be reduced and chromatic aberration can be corrected more effectively.

The resin layer is bonded to the first lens 1 on the surface S2a with the smaller curvature radius, and the aspherical surface S2 formed on a resin layer is shaped so that the negative refractive power decreases toward the edges. As a result, various types of aberrations, especially distortion and astigmatism, can be effectively corrected.

Furthermore, in the first lens 1, the following condition (7) is met:

$$1 < |R2a/R2| < 1.5 \quad (7)$$

where R2a is the curvature radius of the surface S2a where the glass lens and the resin layer are joined, and R2 is the curvature radius of the surface S2, which is formed as an aspherical surface.

Figure 6:
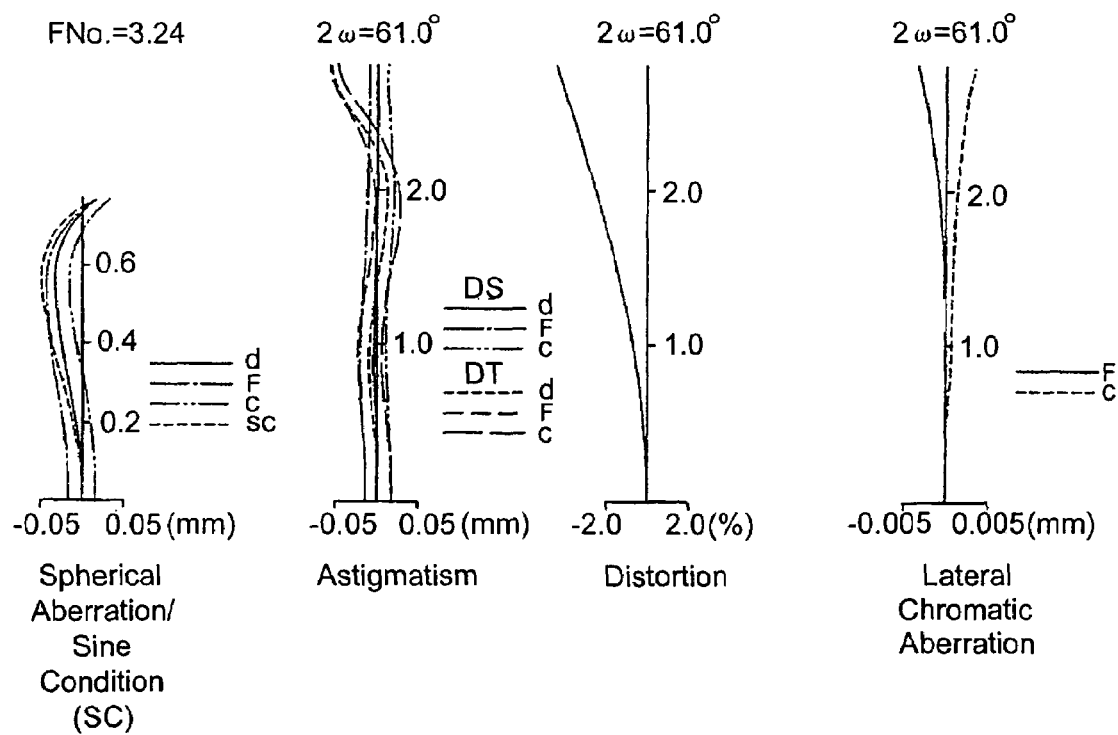
FIG. 6 shows aberration diagrams for spherical aberration, astigmatism, distortion, and lateral chromatic aberration at the wide-angle end of a zoom lens according to the second embodiment.
Figure 7:
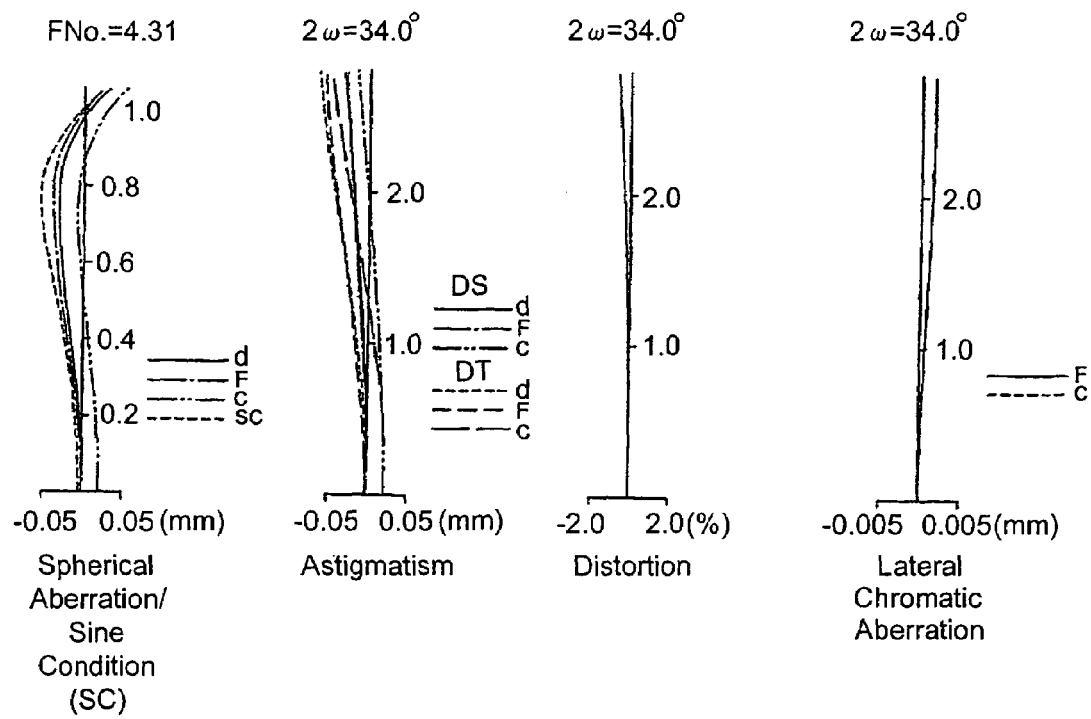
FIG. 7 shows aberration diagrams for spherical aberration, astigmatism, distortion, and lateral chromatic aberration at the middle position of a zoom lens according to the second embodiment.
Figure 8:
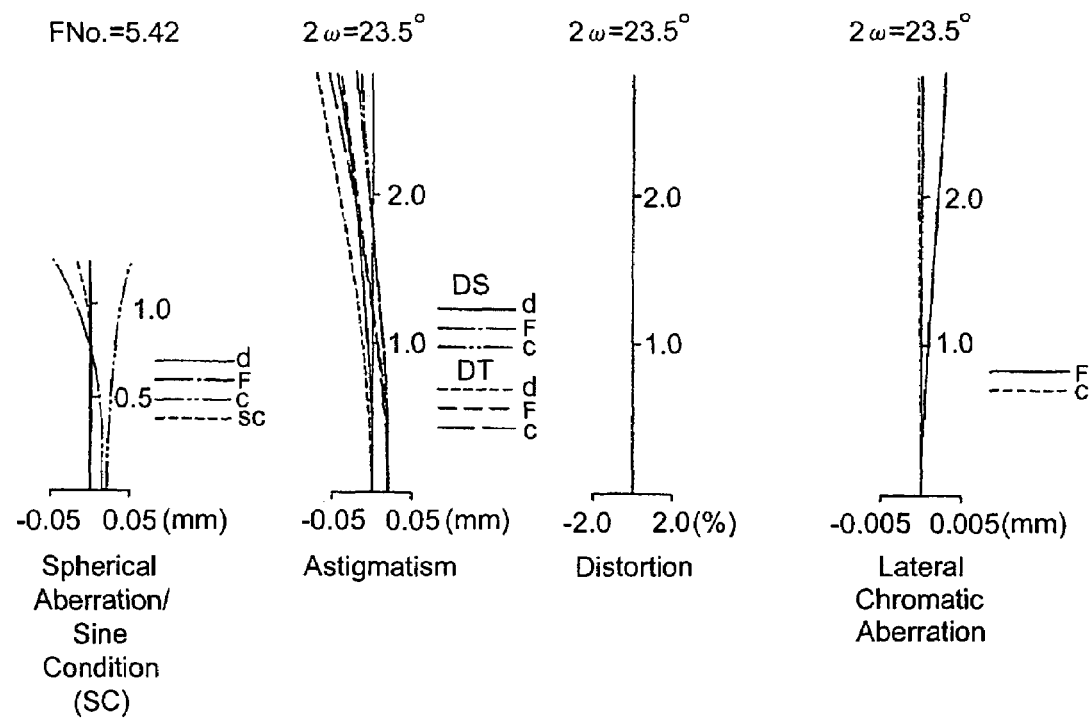
FIG. 8 shows aberration diagrams for spherical aberration, astigmatism, distortion, and lateral chromatic aberration at the telescopic end of a zoom lens according to the second embodiment.

Aberration diagrams for spherical aberration, astigmatism, distortion, and lateral chromatic aberration at the wide-angle end, the middle position, and the telescopic end are as shown in FIG. 6, FIG. 7, and FIG. 8. In FIG. 6 through FIG. 8, the aberration at the line d is indicated by d, the aberration at line F is indicated by F, the aberration at line c is indicated by c. SC indicates offense against the sine condition, DS indicates sagittal plane aberration, and DT indicates meridional plane aberration.

TABLE 5

| | | | |
|---|---|---|---|
| Object Distance (mm) | Infinity (∞) | Thickness of Second Lens Group II (mm) | 5.40 |
| Focal Length (mm) | 4.98~9.20~13.45 | Total Thickness of Lens Groups (mm) | 9.70 |
| F Number | 3.24~4.31~5.42 | Back Focus (Air Conversion) (mm) | 7.70~11.19~14.70 |
| Exit Pupil Position (mm) | −11.77~−15.26~−18.77 | Field Angle (2ω) | 61.0°~34.0°~23.5° |
| Exit Angle of Outermost Light Ray | 11.8°~11.17°~9.1° | Focal Length f1 (mm) | −9.228 |
| Total Length of Lens (mm) | 19.65~13.16~10.74 | Focal Length f2 (mm) | 7.634 |
| Total Length of Lens System (mm) | 27.83~24.83~25.92 | Focal Length fw at Wide-Angle End (mm) | 4.980 |
| Thickness of First Lens Group I (mm) | 4.30 | | |

The condition (7) defines a suitable ratio between the curvature radii of the bonded surface S2a and the aspherical surface S2. If the upper limit is exceeded, the thickness at the outermost edge becomes significantly thicker than the thickness at the center of the resin layer, which negatively affects the precision of the aspherical surface. If the lower limit is exceeded, the thickness at the outermost edge becomes significantly thinner than the thickness at the center of the resin layer, which negatively affects the precision of the aspherical surface. Also, if the value is not in this range, the shape can change due to temperature and moisture absorption and the like. Also, the amount of material for use increases, thus increases costs.

As a result, by meeting the condition (7), the shape of the resin layer of the first lens is prevented from changing due to temperature changes and moisture absorption and the like. This allows the aspherical surface S2 to be formed with a high degree of precision, providing effective correction of various types of aberrations and improving production efficiency.

An embodiments where specific numerical values are used for the above structure will be described below in the form of a second embodiment. For the second embodiment, the various specifications data are shown in Table 5, the various numerical data (settings) are shown in Table 6, and numerical data relating to aspherical surfaces are shown in Table 7. Table 8 shows the focal length f (respectively, fw, fm, ft) of the overall lens system for the wide-angle end, the middle position, the telescopic end and numerical data for the surface distances D4, D11 along the optical axis L.

In the second embodiment, the numerical data for condition (1) through condition (7) are as follows: (1) f2/|f1|=0.827; (2) |f1|/fw 32 1.853; (3) v4=38.0>v5=23.8; (4) R7/R9=1.221;(5)v1−v2=16.9;(6) D2/fw=0.321;(7) |R2a/R2|=1.231.

TABLE 6

| Surface | | Curvature Radius (mm) | | Distance (mm) | | Index of Refraction (line d) | Abbe Number |
|---|---|---|---|---|---|---|---|
| S1 | R1 | 24.905 | | | | | |
| | | | D1 | 1.250 | N1 | 1.80610 | v1 40.7 |
| S2a | R2a | 4.113 | | | | | |
| | | | D1a | 0.050 | N1a | 1.51313 | v1a 53.9 |
| S2* | R2 | 3.340 | | | | | |
| | | | D2 | 1.600 | | | |
| S3 | R3 | 5.831 | | | | | |
| | | | D3 | 1.400 | N2 | 1.84666 | v2 23.8 |
| S4 | R4 | 10.186 | | | | | |
| | | | D4 | Variable | | | |
| S5* | R5 | 5.940 | | | | | |
| | | | D5 | 1.300 | N3 | 1.48419 | v3 70.0 |
| S6 | R6 | −23.449 | | | | | |
| | | | D6 | 0.150 | | | |
| S7 | R7 | 3.542 | | | | | |
| | | | D7 | 1.200 | N4 | 1.60342 | v4 38.0 |
| S8 | R8 | 10.100 | | | | | |
| | | | D8 | 0.550 | N5 | 1.84666 | v5 23.8 |
| S9 | R9 | 2.900 | | | | | |
| | | | D9 | 0.900 | | | |
| S10 | R10 | 13.393 | | | | | |
| | | | D10 | 1.300 | N6 | 1.51450 | v6 63.1 |
| S11* | R11 | −10.678 | | | | | |
| | | | D11 | Variable | | | |
| S12 | | ∞ | | | | | |
| | | | D12 | 0.900 | N7 | 1.51680 | v7 64.2 |
| S13 | | ∞ | | | | | |
| | | | D13 | 0.500 | | | |
| S14 | | ∞ | | | | | |
| | | | D14 | 0.500 | N8 | 1.51680 | v8 64.2 |
| S15 | | ∞ | | | | | |
| | | | BF | 0.500 | | | |

*Aspherical surface

TABLE 7

| Surface | Aspherical Surface Coefficient | Numerical Data |
|---|---|---|
| S2 | ε | 0.2230000 |
|  | D | $0.4103460 \times 10^{-3}$ |
|  | E | $0.1086030 \times 10^{-4}$ |
|  | F | $-0.1652350 \times 10^{-5}$ |
|  | G | $-0.1854690 \times 10^{-9}$ |
|  | H | $-0.3368230 \times 10^{-8}$ |
| S5 | ε | 1.0000000 |
|  | D | $-0.7670420 \times 10^{-3}$ |
|  | E | $-0.2741760 \times 10^{-4}$ |
|  | F | $-0.1552780 \times 10^{-5}$ |
|  | G | $-0.7294890 \times 10^{-7}$ |
|  | H | 0.0 |
| S11 | ε | 1.0000000 |
|  | D | $0.1980620 \times 10^{-3}$ |
|  | E | $0.5208730 \times 10^{-5}$ |
|  | F | $0.2156490 \times 10^{-6}$ |
|  | G | $0.5215280 \times 10^{-8}$ |
|  | H | 0.0 |

TABLE 8

|  | Wide-Angle End | Middle Position | Telescopic End |
|---|---|---|---|
| f (mm) | 4.98 (fw) | 9.20 (fm) | 13.45 (ft) |
| D4 (mm) | 9.950 | 3.461 | 1.043 |
| D11 (mm) | 5.777 | 9.269 | 12.781 |

In the second embodiment described above: the length of the total lens system (the front surface S1 of the first lens group to the image plane) is 27.83 mm (wide-angle end)—24.83 mm (middle)—25.92 mm (telescopic end); the total dimension along the optical axis for the lens groups (thickness of the first lens group I+thickness of the second lens group II) is 9.70 mm; the back focus (air conversion) is 7.70 mm (wide-angle end)—11.19 mm (middle)—14.70 mm (telescopic end); the F number is 3.24 (wide-angle end)—4.31 (middle)—5.42 (telescopic end); and distortion is |5%| or less. Various types of aberrations are corrected effectively and a thin, compact zoom lens with superior optical properties suited for imaging elements with high pixel counts is provided.

Figure 9:
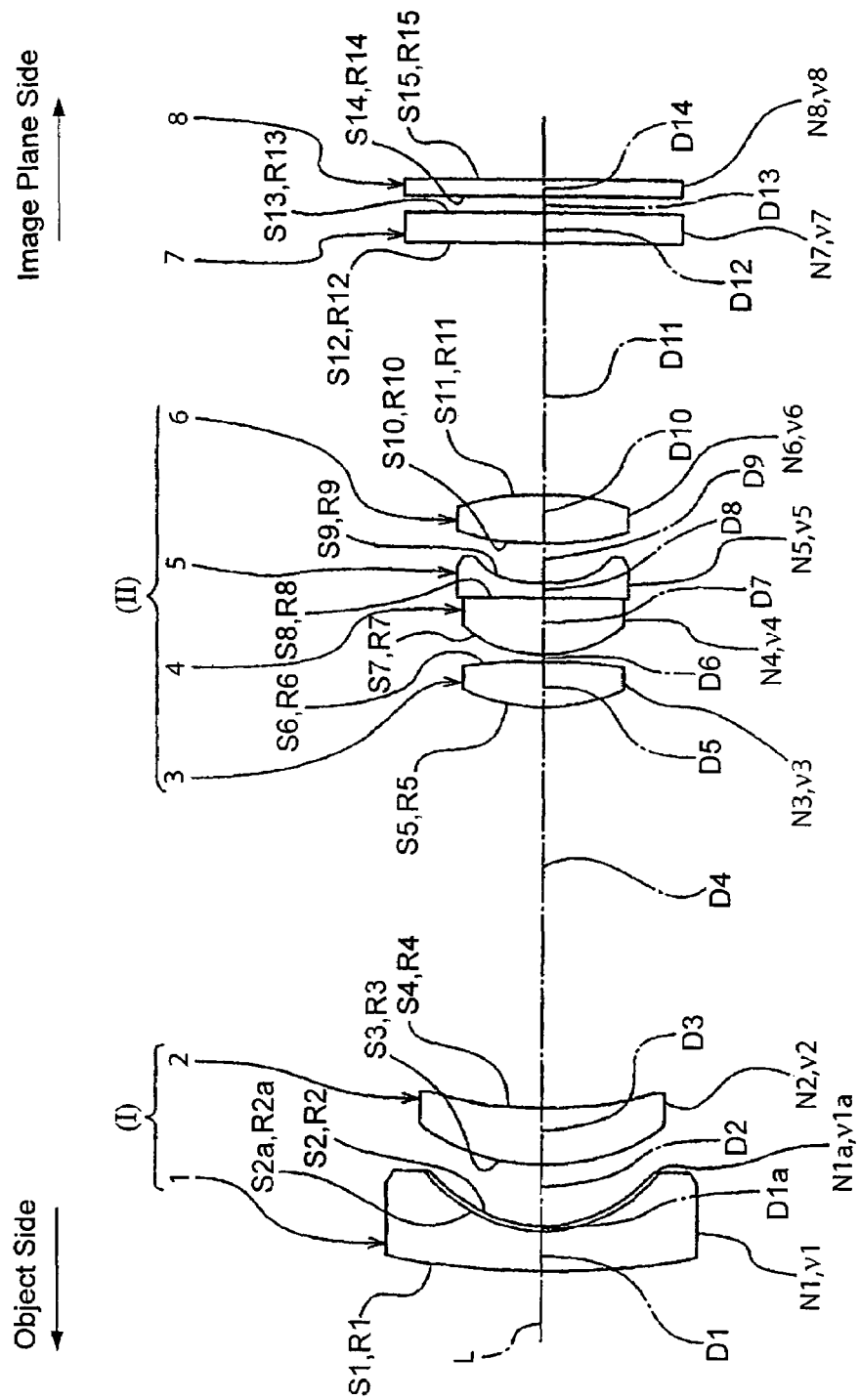
FIG. 9 is a drawing showing the structure of a third embodiment of a zoom lens according to the present invention.

FIG. 9 shows the basic structure of yet another embodiment of a zoom lens according to the present invention. The structure is identical to that of the embodiment shown in FIG. 5 (second embodiment), and therefore the structure will not be described here.

An embodiments where specific numerical values are used for the above structure will be described below in the form of a third embodiment. For the third embodiment, the various specifications data are shown in Table 9, the various numerical data (settings) are shown in Table 10, and numerical data relating to aspherical surfaces are shown in Table 11. Table 12 shows the focal length f (respectively, fw, fm, ft) of the overall lens system for the wide-angle end, the middle position, and the telescopic end and numerical data for the surface distances D4, D11 along the optical axis L.

In the third embodiment, the numerical data for condition (1) through condition (7) are as follows: (1) f2/|f1|=0.825; (2) |f1|/fw=1.851; (3) ν4=64.2>ν5=33.3; (4) R7/R9=1.136;(5) ν1−ν2=16.9;(6)D2/fw=0.313;(7) |R2a/R2|=1.231.

Aberration diagrams for spherical aberration, astigmatism, distortion, and lateral chromatic aberration at the wide-angle end, the middle position, and the telescopic end are as shown in FIG. 10, FIG. 11, and FIG. 12. In FIG. 10 through FIG. 12, the aberration at the line d is indicated by d, the aberration at line F is indicated by F, the aberration at line c is indicated by c. SC indicates offense against the sine condition, DS indicates sagittal plane aberration, and DT indicates meridional plane aberration.

TABLE 9

| Object Distance (mm) | Infinity (∞) | Thickness of Second Lens Group II (mm) | 6.68 |
|---|---|---|---|
| Focal Length (mm) | 6.40~12.16~17.92 | Total Thickness of Lens Groups (mm) | 11.63 |
| F Number | 3.25~4.42~5.61 | Back Focus (Air Conversion) (mm) | 9.78~14.53~19.28 |
| Exit Pupil Position (mm) | −15.01~−19.76~−24.51 | Field Angle (2ω) | 60.9°~33.1°~22.7° |
| Exit Angle of Outermost Light Ray | 12.1°~11.1°~8.9° | Focal Length f1 (mm) | −11.848 |
| Total Length of Lens (mm) | 24.33~15.76~12.70 | Focal Length f2 (mm) | 9.769 |
| Total Length of Lens System (mm) | 34.59~30.77~32.46 | Focal Length fw at Wide-Angle End (mm) | 6.400 |
| Thickness of First Lens Group I (mm) | 4.95 | | |

TABLE 10

| Surface | Curvature Radius (mm) | | Distance (mm) | Index of Refraction (line d) | | Abbe Number |
|---|---|---|---|---|---|---|
| S1 | R1 | 31.133 | | | | |
| | | | D1 | 1.200 | N1 1.80610 v1 | 40.7 |
| S2a | R2a | 5.220 | | | | |
| | | | D1a | 0.050 | N1a 1.51313 v1a | 53.9 |
| S2* | R2 | 4.239 | | | | |
| | | | D2 | 2.000 | | |
| S3 | R3 | 7.404 | | | | |
| | | | D3 | 1.700 | N2 1.84666 v2 | 23.8 |
| S4 | R4 | 13.163 | | | | |
| | | | D4 | Variable | | |
| S5* | R5 | 7.613 | | | | |
| | | | D5 | 1.500 | N3 1.51450 v3 | 63.1 |
| S6 | R6 | −23.245 | | | | |
| | | | D6 | 0.150 | | |
| S7 | R7 | 4.105 | | | | |
| | | | D7 | 1.600 | N4 1.51680 v4 | 64.2 |
| S8 | R8 | 45.000 | | | | |
| | | | D8 | 0.630 | N5 1.80610 v5 | 33.3 |
| S9 | R9 | 3.612 | | | | |
| | | | D9 | 1.300 | | |
| S10 | R10 | 17.386 | | | | |
| | | | D10 | 1.500 | N6 1.51450 v6 | 63.1 |
| S11* | R11 | −12.683 | | | | |
| | | | D11 | Variable | | |
| S12 | | ∞ | | | | |
| | | | D12 | 0.900 | N7 1.51680 v7 | 64.2 |
| S13 | | ∞ | | | | |
| | | | D13 | 0.500 | | |
| S14 | | ∞ | | | | |
| | | | D14 | 0.500 | N8 1.51680 v8 | 64.2 |
| S15 | | ∞ | | | | |
| | | | BF | 0.500 | | |

*Aspherical surface

TABLE 11

| Surface | Aspherical Surface Coefficient | Numerical Data |
|---|---|---|
| S2 | ε | 0.2248000 |
| | D | 0.1938790 × 10⁻³ |
| | E | 0.3071690 × 10⁻⁵ |
| | F | −0.2910730 × 10⁻⁶ |
| | G | −0.2641060 × 10⁻¹⁰ |
| | H | −0.2450000 × 10⁻⁹ |
| S5 | ε | 1.0000000 |
| | D | −0.3255306 × 10⁻³ |
| | E | −0.7113555 × 10⁻⁵ |
| | F | −0.2522561 × 10⁻⁶ |
| | G | −0.6992022 × 10⁻⁸ |
| | H | 0.0 |
| S11 | ε | 1.0000000 |
| | D | 0.1000000 × 10⁻³ |
| | E | 0.1480948 × 10⁻⁵ |
| | F | 0.3706728 × 10⁻⁷ |
| | G | 0.5400299 × 10⁻⁹ |
| | H | 0.0 |

TABLE 12

| | Wide-Angle End | Middle Position | Telescopic End |
|---|---|---|---|
| f (mm) | 6.40 (fw) | 12.16 (fm) | 17.92 (ft) |
| D4 (mm) | 12.700 | 4.133 | 1.074 |
| D11 (mm) | 7.860 | 12.609 | 17.358 |

In the third embodiment described above: the length of the total lens system during imaging (the front surface S1 of the first lens group to the image plane) is 34.59 mm (wide-angle end)—30.77 mm (middle)—32.46 mm (telescopic end); the total dimension along the optical axis for the lens groups (thickness of the first lens group I+thickness of the second lens group II) is 11.63 mm; the back focus (air conversion) is 9.78 mm (wide-angle end)—14.53 mm (middle)—19.28 mm (telescopic end); the F number is 3.25 (wide-angle end)—4.42 (middle)—5.61 (telescopic end); and distortion is |5%| or less. Various types of aberrations are corrected effectively and a thin, compact zoom lens with superior optical properties suited for imaging elements with high pixel counts is provided.

Figure 13:
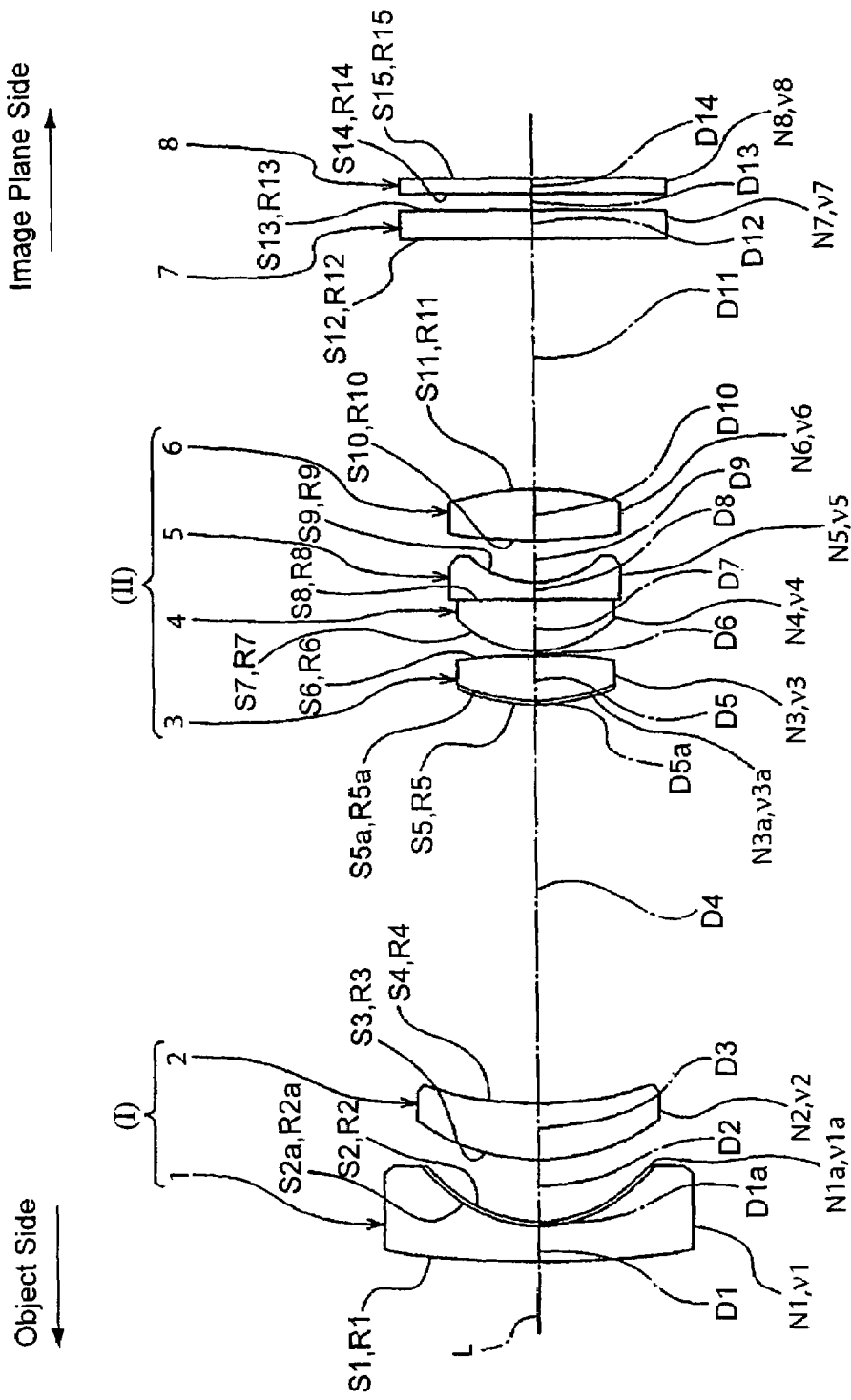
FIG. 13 is a drawing showing the structure of a fourth embodiment of a zoom lens according to the present invention.

FIG. 13 shows the basic structure of yet another embodiment of a zoom lens according to the present invention. The structure is identical to that of the embodiment shown in FIG. 5 (second embodiment) except making the third lens 3 as a hybrid lens. Structures identical to those from the second embodiment will not be described here.

As shown in FIG. 13, the third lens 3 is a hybrid lens in which a glass lens forms a biconvex shape with a convex object-side surface S5a and a convex image plane side surface S6 so that there is a positive refractive power, and a resin layer formed from a resin material is bonded to the surface S5a, which has a smaller curvature radius. The object side surface S5 with the resin layer forms an aspherical surface.

The resin layer has an index of refraction N3a, an Abbe number v3a, and a thickness D5a along the optical axis L.

If the third lens with the aspherical surface were to be formed solely from a glass material or a resin material, e.g., plastic, the type of glass material or resin material that could be used would be limited. However, by applying a resin layer to a glass lens as described above and forming the resin layer as an aspherical surface, different types of glass materials can be used for the glass lens serving as the base. Thus, costs can be reduced and chromatic aberration can be corrected more effectively.

The resin layer is bonded to the third lens 3 on the surface S5a with the smaller curvature radius, and the aspherical surface S5 formed an a resin layer is shaped so that the positive refractive power decreases toward the edges. As a result, various types of aberrations, especially spherical aberration, can be effectively corrected.

Furthermore, in the third lens 3, the following condition (8) is met:

$$0.7 < |R5a/R5| < 2.0 \tag{8}$$

where R5a is the curvature radius of the surface S5a where the glass lens and the resin layer are joined, and R5 is the curvature radius of the surface S5, which is formed as an aspherical surface.

The condition (8) defines a suitable ratio between the curvature radii of the bonded surface S5a and the aspherical surface S5. If the upper limit is exceeded, the thickness at the outermost edge becomes significantly thinner than the thickness at the center of the resin layer, which negatively affects the precision of the aspherical surface. If the lower limit is exceeded, the thickness at the outermost edge becomes significantly thicker than the thickness at the center of the resin layer, which negatively affects the precision of the aspherical surface. Also, if the value is not in this range, the shape can change due to temperature and moisture absorption and the like. Also, the amount of material for use increases, thus increases costs.

As a result, by meeting the condition (8), the shape of the resin layer of the third lens 3 is prevented from changing due to temperature changes or moisture absorption. This allows the aspherical surface S5 to be formed with a high degree of precision, providing effective correction of various types of aberration and improving production efficiency.

An embodiment where specific numerical values are used for the above structure will be described below in the form of a fourth embodiment. For the fourth embodiment, the various specifications data are shown in Table 13, the various numerical data (settings) are shown in Table 14, and numerical data relating to aspherical surfaces are shown in Table 15. Table 16 shows the focal length f respectively, fw, fm, ft of the overall lens system for the wide-angle end, the middle position, and the telescopic end and numerical data for the surface distances D4, D11 along the optical axis L.

In the fourth embodiment, the numerical data for condition (1) through condition (8) are as follows: (1) f2/|f1|=0.825; (2) |f1|/fw=1.851; (3) v4=64.2>v5=33.3; (4) R7/R9=1.136; (5) v1−v2=16.9; (6) D2/fw=0.313; (7) |R2a/R2|=1.231; and (8) |R5a/R5|=1.00

Figure 15:
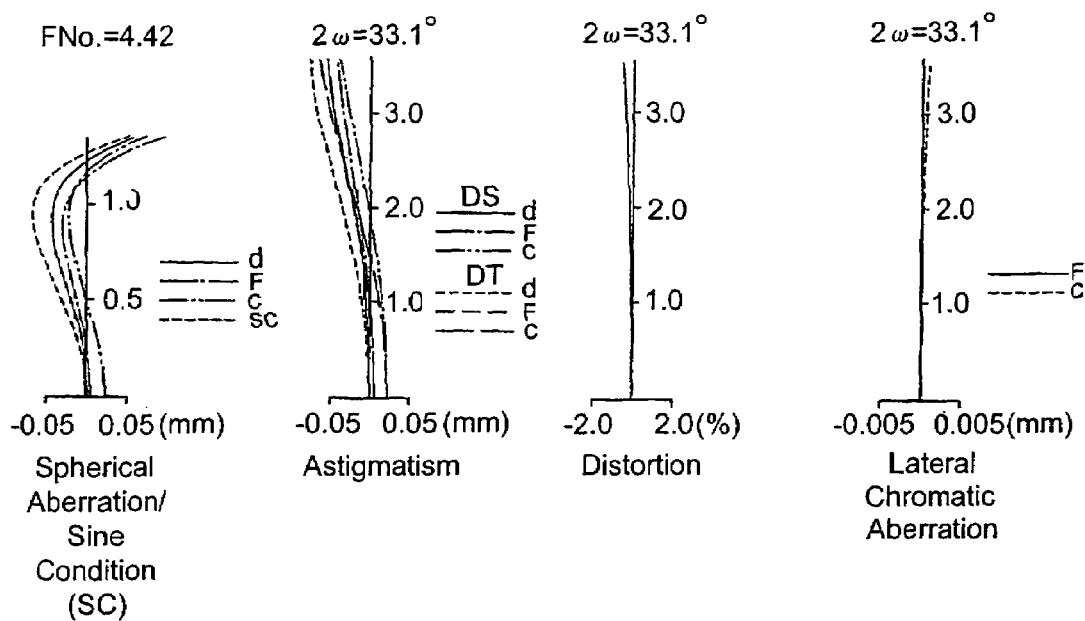
FIG. 15 shows aberration diagrams for spherical aberration, astigmatism, distortion, and lateral chromatic aberration at the middle position of a zoom lens according to the fourth embodiment.
Figure 16:
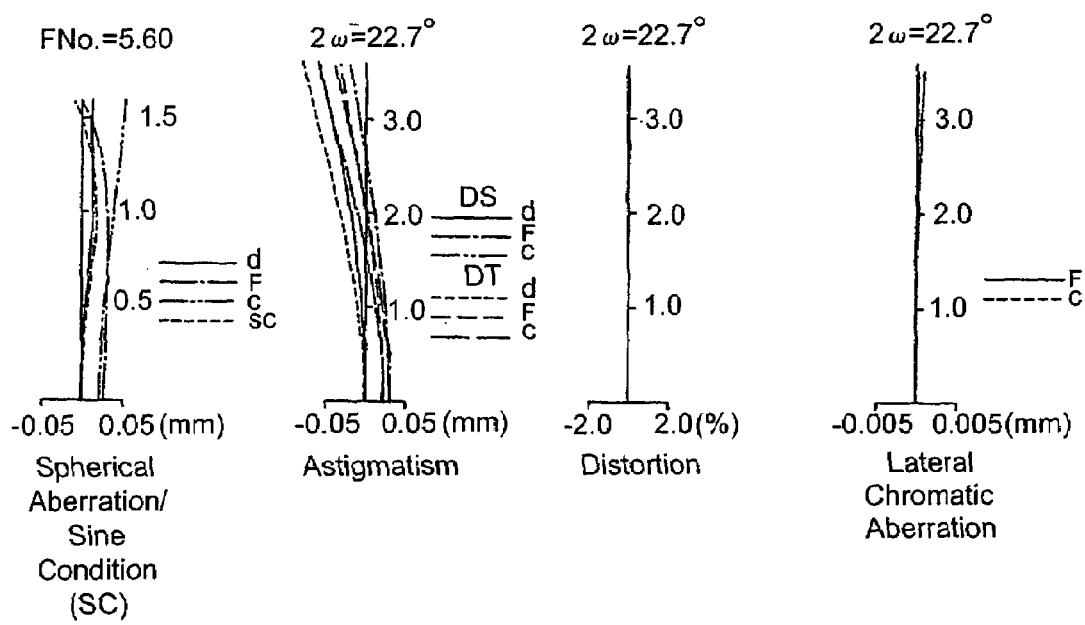
FIG. 16 shows aberration diagrams for spherical aberration, astigmatism, distortion, and lateral chromatic aberration at the telescopic end of a zoom lens according to the fourth embodiment.

Aberration diagrams for spherical aberration, astigmatism, distortion, and lateral chromatic aberration at the wide-angle end, the middle position, and the telescopic end are as shown in FIG. 14, FIG. 15, and FIG. 16. In FIG. 14 through FIG. 16, the aberration at the line d is indicated by d, the aberration at line F is indicated by F, the aberration at line c is indicated by c. SC indicates offense against the sine condition, DS indicates sagittal plane aberration, and DT indicates meridional plane aberration.

TABLE 13

| Object Distance (mm) | Infinity (∞) | Thickness of Second Lens Group II (mm) | 6.68 |
|---|---|---|---|
| Focal Length (mm) | 6.40~12.16~17.92 | Total Thickness of Lens Groups (mm) | 11.63 |
| F Number | 3.25~4.42~5.60 | Back Focus (Air Conversion) (mm) | 9.78~14.53~19.28 |
| Exit Pupil Position (mm) | −15.01~−19.76~−24.51 | Field Angle (2ω) | 60.9°~33.1°~22.7° |
| Exit Angle of Outermost Light Ray | 12.1°~11.1°~8.9° | Focal Length f1 (mm) | −11.848 |
| Total Length of Lens (mm) | 24.33~15.76~12.70 | Focal Length f2 (mm) | 9.769 |
| Total Length of Lens System (mm) | 34.59~30.77~32.46 | Focal Length fw at Wide-Angle End (mm) | 6.400 |
| Thickness of First Lens Group I (mm) | 4.95 | | |

TABLE 14

| Surface | Curvature Radius (mm) | | Distance (mm) | Index of Refraction (line d) | Abbe Number |
|---|---|---|---|---|---|
| S1 | R1 | 31.133 | | | |
| | | | D1 1.200 | N1 1.80610 | v1 40.7 |
| S2a | R2a | 5.220 | | | |
| | | | D1a 0.050 | N1a 1.51313 | v1a 53.9 |
| S2* | R2 | 4.239 | | | |
| | | | D2 2.000 | | |
| S3 | R3 | 7.404 | | | |
| | | | D3 1.700 | N2 1.84666 | v2 23.8 |
| S4 | R4 | 13.163 | | | |
| | | | D4 Variable | | |
| S5* | R5 | 7.642 | | | |
| | | | D5a 0.050 | N3a 1.51313 | v3a 53.9 |
| S5a | R5a | 7.642 | | | |
| | | | D5 1.450 | N3 1.51680 | v3 64.2 |
| S6 | R6 | −23.402 | | | |
| | | | D6 0.150 | | |
| S7 | R7 | 4.105 | | | |
| | | | D7 1.600 | N4 1.51680 | v4 64.2 |
| S8 | R8 | 45.000 | | | |
| | | | D8 0.630 | N5 1.80610 | v5 33.3 |
| S9 | R9 | 3.612 | | | |
| | | | D9 1.300 | | |
| S10 | R10 | 17.386 | | | |
| | | | D10 1.500 | N6 1.51450 | v6 63.1 |
| S11* | R11 | −12.683 | | | |
| | | | D11 Variable | | |
| S12 | | ∞ | | | |
| | | | D12 0.900 | N7 1.51680 | v7 64.2 |
| S13 | | ∞ | | | |
| | | | D13 0.500 | | |
| S14 | | ∞ | | | |
| | | | D14 0.500 | N8 1.51680 | v8 64.2 |
| S15 | | ∞ | | | |
| | | | BF 0.500 | | |

*Aspherical surface

TABLE 15

| Surface | Aspherical Surface Coefficient | Numerical Data |
|---|---|---|
| S2 | ε | 0.2248000 |
| | D | 0.1938790 × 10⁻³ |
| | E | 0.3071690 × 10⁻⁵ |
| | F | −0.2910730 × 10⁻⁶ |
| | G | −0.2641060 × 10⁻¹⁰ |
| | H | −0.2450000 × 10⁻⁹ |
| S5 | ε | 1.0000000 |
| | D | −0.3255306 × 10⁻³ |
| | E | −0.7113555 × 10⁻⁵ |
| | F | −0.2522561 × 10⁻⁶ |
| | G | −0.6992022 × 10⁻⁸ |
| | H | 0.0 |

TABLE 15-continued

| Surface | Aspherical Surface Coefficient | Numerical Data |
|---|---|---|
| S11 | ε | 1.0000000 |
| | D | $0.1000000 \times 10^{-3}$ |
| | E | $0.1480948 \times 10^{-5}$ |
| | F | $0.3706728 \times 10^{-7}$ |
| | G | $0.5400299 \times 10^{-9}$ |
| | H | 0.0 |

TABLE 16

| | Wide-Angle End | Middle Position | Telescopic End |
|---|---|---|---|
| f (mm) | 6.40 (fw) | 12.16 (fm) | 17.92 (ft) |
| D4 (mm) | 12.700 | 4.134 | 1.075 |
| D11 (mm) | 7.861 | 12.610 | 17.359 |

In the fourth embodiment described above: the length of the total lens system during imaging (the front surface S1 of the first lens group to the image plane) is 34.59 mm (wide-angle end)—30.77 mm (middle)—32.46 mm (telescopic end); the total dimension along the optical axis for the lens groups (thickness of the first lens group I+thickness of the second lens group II) is 11.63 mm; the back focus (air conversion) is 9.78 mm (wide-angle end)—14.53 mm (middle)—19.28 mm (telescopic end); the F number is 3.25 (wide-angle end)—4.42 (middle)—5.60 (telescopic end); and distortion is |5%| or less. Various types of aberrations are corrected effectively and a thin, compact zoom lens with superior optical properties suited for imaging elements with high pixel counts is provided.

Figure 17:
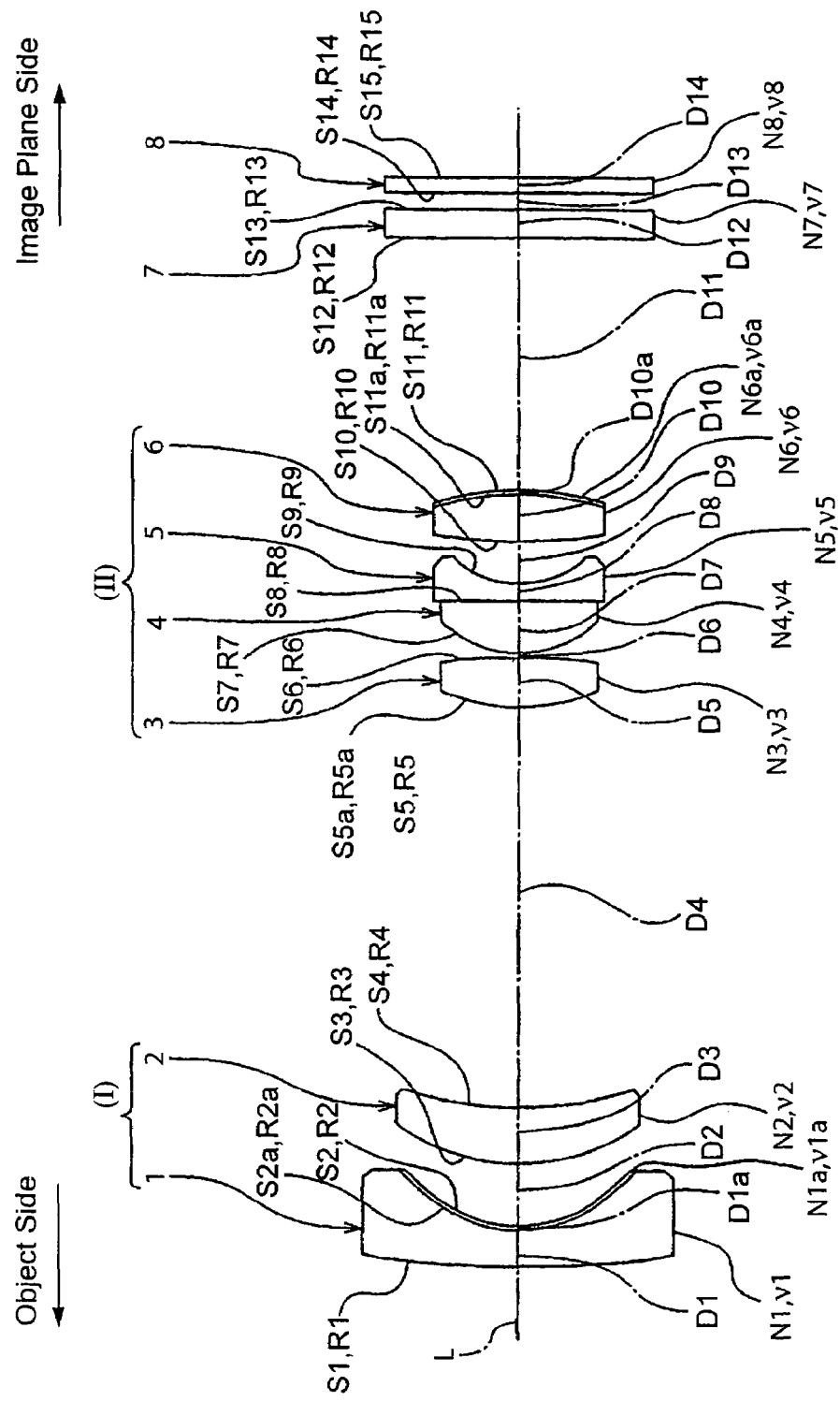
FIG. 17 is a drawing showing the structure of a fifth embodiment of a zoom lens according to the present invention.

FIG. 17 shows the basic structure of yet another embodiment of a zoom lens according to the present invention. The structure is identical to that of the embodiment shown in FIG. 5 (second embodiment) except making the sixth lens 6 as a hybrid lens. Structures identical to those from the second embodiment will not be described here.

As shown in FIG. 17, the sixth lens 6 is a hybrid lens in which a glass lens forms a biconvex shape with a convex object-side surface S10 and a convex image plane side surface S11a so that there is a positive refractive power, and a resin layer formed from a resin material is bonded to the image plane side surface S11a. The image plane side surface S11 with the resin layer forms an aspherical surface.

The resin layer has an index of refraction N6a, an Abbe number ν6a, and a thickness D10a along the optical axis L.

If the sixth lens with the aspherical surface were to be formed solely from a glass material or a resin material, e.g., plastic, the type of glass material or resin material that could be used would be limited. However, by applying a resin layer to a glass lens as described above and forming the resin layer as an aspherical surface, different types of glass material can be used for the glass lens serving as the base. Thus, costs can be reduced and chromatic aberration can be corrected more effectively.

The resin layer is bonded to the sixth lens 6 on the image plane side surface S11a, and the aspherical surface S11 formed on a resin layer is shaped so that the positive refractive power decreases toward the edges. As a result, various types of aberrations, especially astigmatism and coma aberration, can be effectively corrected.

Furthermore, in the sixth lens 6, the following condition (9) is met:

$$0.5 < |R11a/R11| < 2.0 \tag{9}$$

where R11a is the curvature radius of the surface S11a where the glass lens and the resin layer are joined, and R11 is the curvature radius of the surface S11, on which an aspherical surface is formed.

The condition (9) defines a suitable ratio between the curvature radii of the bonded surface S11a and the aspherical surface S11. If the upper limit is exceeded, the thickness at the outermost edge becomes significantly thinner than the thickness at the center of the resin layer, which negatively affects the precision of the aspherical surface. If the lower limit is exceeded, the thickness at the outermost edge becomes significantly thicker than the thickness at the center of the resin layer, which negatively affects the precision of the aspherical surface. Also, if the value is not in this range, the shape can change due to temperature and moisture absorption. Also, the amount of material for use increases, thus increases costs.

As a result, by meeting the condition (9), the shape of the resin layer of the sixth lens 6 is prevented from changing due to temperature changes or moisture absorption. This allows the aspherical surface S11 to be formed with a high degree of precision, providing effective correction of various types of aberrations and improving production efficiency.

An embodiments where specific numerical values are used for the above structure will be described below in the form of fifth embodiment. For the fifth embodiment, the various specifications data are shown in Table 17, the various numerical data (settings) are shown in Table 18, and numerical data relating to aspherical surfaces are shown in Table 19. Table 20 shows the focal length f respectively, fw, fm, ft of the overall lens system for the wide-angle end, the middle position, and the telescopic end and numerical data for the surface distances D4, D11 along the optical axis L.

In the fifth embodiment, the numerical data for condition (1) through condition (7) and condition (9) are as follows: (1) f2/|f1|=0.824; (2) |f1|/fw=1.851; (3) ν4=64.2>ν5=33.3; (4) R7/R9=1.136; (5) ν1−ν2=16.9; (6) D2/fw=0.313; (7) |R2a/R2|=1.231; and (9) |R11a/R11|=1.00.

Figure 18:
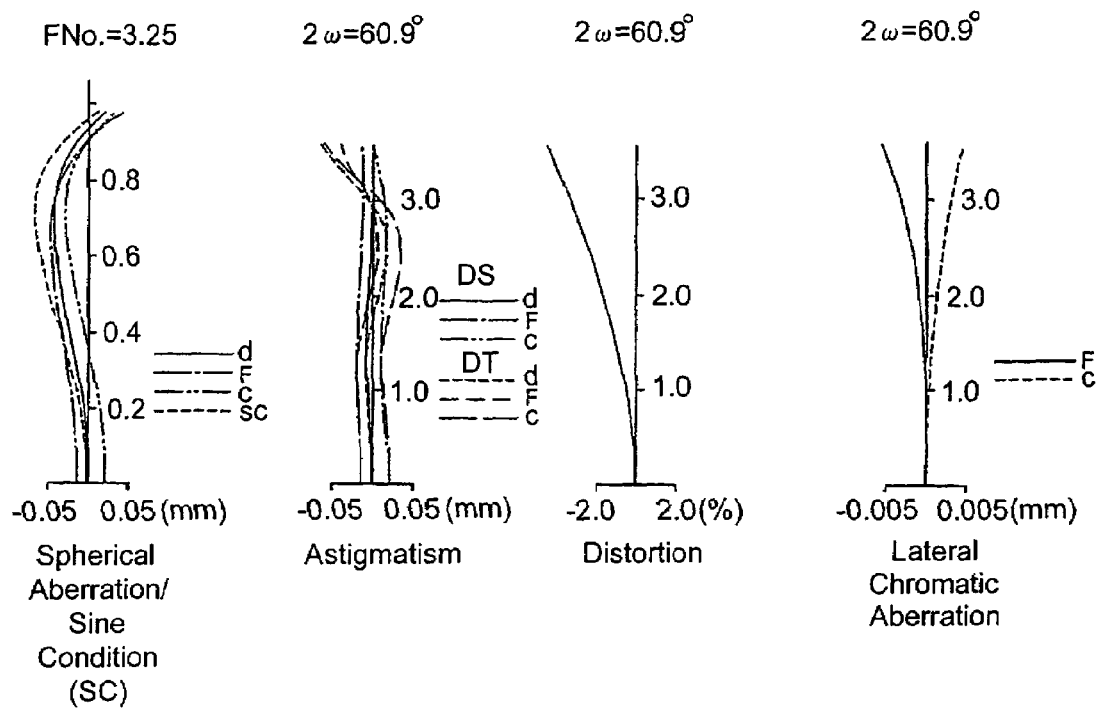
FIG. 18 shows aberration diagrams for spherical aberration, astigmatism, distortion, and lateral chromatic aberration at the wide-angle end of a zoom lens according to the fifth embodiment.
Figure 19:
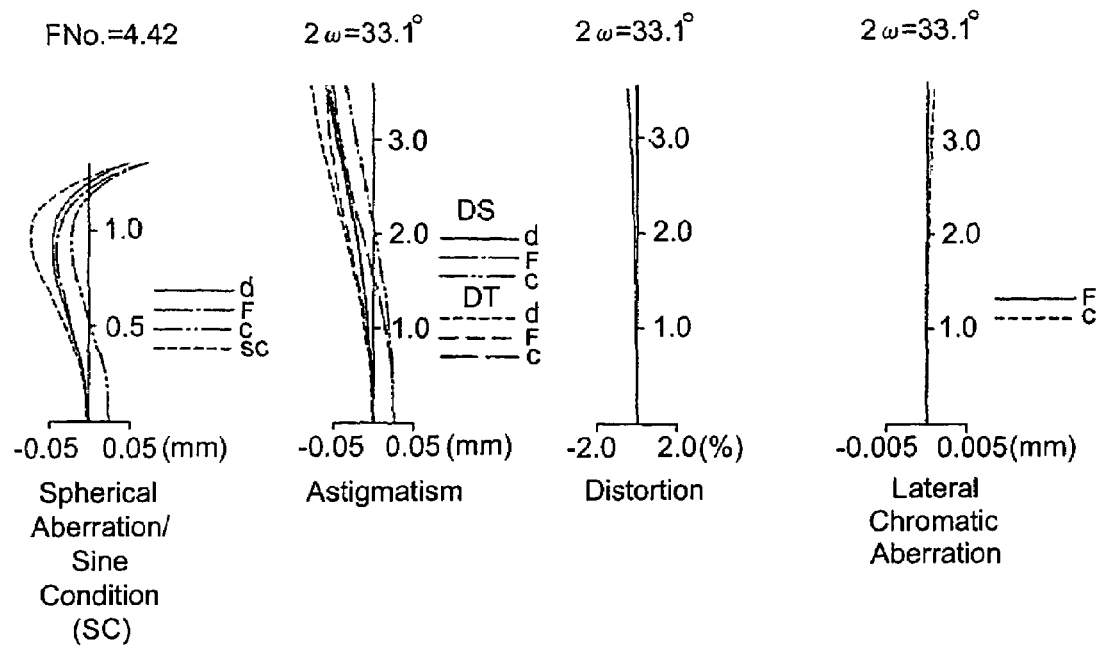
FIG. 19 shows aberration diagrams for spherical aberration, astigmatism, distortion, and lateral chromatic aberration at the middle position of a zoom lens according to the fifth embodiment.
Figure 20:
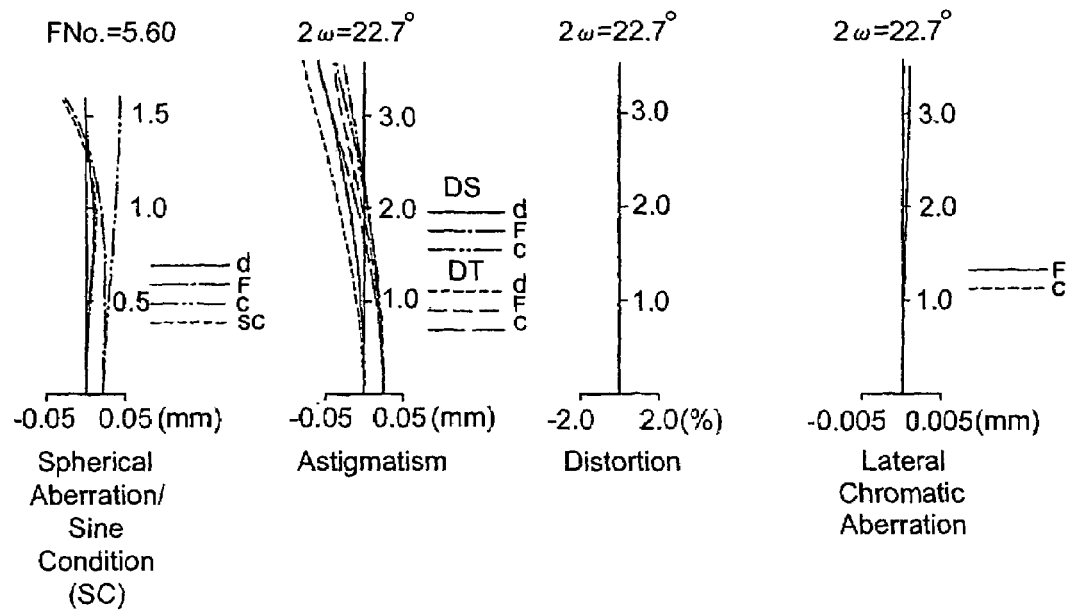
FIG. 20 shows aberration diagrams for spherical aberration, astigmatism, distortion, and lateral chromatic aberration at the telescopic end of a zoom lens according to the fifth embodiment.

Aberration diagrams for spherical aberration, astigmatism, distortion, and lateral chromatic aberration at the wide-angle end, the middle position, and the telescopic end are as shown in FIG. 18, FIG. 19, and FIG. 20. In FIG. 18 through FIG. 20, the aberration at the line d is indicated by d, the aberration at line F is indicated by F, the aberration at line c is indicated by c. SC indicates offense against the sine condition, DS indicates sagittal plane aberration, and DT indicates meridional plane aberration.

TABLE 17

| Object Distance (mm) | Infinity (∞) | Thickness of Second Lens Group II (mm) | 6.68 |
|---|---|---|---|
| Focal Length (mm) | 6.40~12.16~17.92 | Total Thickness of Lens Groups (mm) | 11.63 |

TABLE 17-continued

| | | | |
|---|---|---|---|
| F Number | 3.25~4.42~5.60 | Back Focus (Air Conversion) (mm) | 9.78~14.53~19.28 |
| Exit Pupil Position (mm) | −15.01~−19.76~−24.50 | Field Angle (2ω) | 60.9°~33.1°~22.7° |
| Exit Angle of Outermost Light Ray | 12.1°~11.1°~8.9° | Focal Length f1 (mm) | −11.848 |
| Total Length of Lens (mm) | 24.33~15.76~12.70 | Focal Length f2 (mm) | 9.768 |
| Total Length of Lens System (mm) | 34.59~30.77~32.46 | Focal Length fw at Wide-Angle End (mm) | 6.400 |
| Thickness of First Lens Group I (mm) | 4.95 | | |

TABLE 18

| Surface | | Curvature Radius (mm) | | Distance (mm) | | Index of Refraction (line d) | | Abbe Number |
|---|---|---|---|---|---|---|---|---|
| S1 | R1 | 31.133 | | | | | | |
| | | | D1 | 1.200 | N1 | 1.80610 | ν1 | 40.7 |
| S2a | R2a | 5.220 | | | | | | |
| | | | D1a | 0.050 | N1a | 1.51313 | ν1a | 53.9 |
| S2* | R2 | 4.239 | | | | | | |
| | | | D2 | 2.000 | | | | |
| S3 | R3 | 7.404 | | | | | | |
| | | | D3 | 1.700 | N2 | 1.84666 | ν2 | 23.8 |
| S4 | R4 | 13.163 | | | | | | |
| | | | D4 | Variable | | | | |
| S5* | R5 | 7.613 | | | | | | |
| | | | D5 | 1.500 | N3 | 1.51450 | ν3 | 63.1 |
| S6 | R6 | −23.245 | | | | | | |
| | | | D6 | 0.150 | | | | |
| S7 | R7 | 4.105 | | | | | | |
| | | | D7 | 1.600 | N4 | 1.51680 | ν4 | 64.2 |
| S8 | R8 | 45.000 | | | | | | |
| | | | D8 | 0.630 | N5 | 1.80610 | ν5 | 33.3 |
| S9 | R9 | 3.612 | | | | | | |
| | | | D9 | 1.300 | | | | |
| S10 | R10 | 17.409 | | | | | | |
| | | | D10 | 1.450 | N6 | 1.51680 | ν6 | 64.2 |
| S11a | R11a | −12.771 | | | | | | |
| | | | D10a | 0.050 | N6a | 1.51313 | ν6a | 53.9 |
| S11* | R11 | −12.771 | | | | | | |
| | | | D11 | Variable | | | | |
| S12 | | ∞ | | | | | | |
| | | | D12 | 0.900 | N7 | 1.51680 | ν7 | 64.2 |
| S13 | | ∞ | | | | | | |
| | | | D13 | 0.500 | | | | |
| S14 | | ∞ | | | | | | |
| | | | D14 | 0.500 | N8 | 1.51680 | ν8 | 64.2 |
| S15 | | ∞ | | | | | | |
| | | | BF | 0.500 | | | | |

*Aspherical surface

TABLE 19

| Surface | Aspherical Surface Coefficient | Numerical Data |
|---|---|---|
| S2 | ε | 0.2248000 |
| | D | 0.1938790 × 10⁻³ |
| | E | 0.3071690 × 10⁻⁵ |
| | F | −0.2910730 × 10⁻⁶ |
| | G | −0.2641060 × 10⁻¹⁰ |
| | H | −0.2450000 × 10⁻⁹ |
| S5 | ε | 1.0000000 |
| | D | −0.3255306 × 10⁻³ |
| | E | −0.7113555 × 10⁻⁵ |
| | F | −0.2522561 × 10⁻⁶ |

TABLE 19-continued

| Surface | Aspherical Surface Coefficient | Numerical Data |
|---|---|---|
| | G | −0.6992022 × 10⁻⁸ |
| | H | 0.0 |
| S11 | ε | 1.0000000 |
| | D | 0.1000000 × 10⁻³ |
| | E | 0.1480948 × 10⁻⁵ |
| | F | 0.3706728 × 10⁻⁷ |
| | G | 0.5400299 × 10⁻⁹ |
| | H | 0.0 |

TABLE 20

| | Wide-Angle End | Middle Position | Telescopic End |
|---|---|---|---|
| f (mm) | 6.40 (fw) | 12.16 (fm) | 17.92 (ft) |
| D4 (mm) | 12.700 | 4.134 | 1.075 |
| D11 (mm) | 7.859 | 12.608 | 17.358 |

In the fifth embodiment described above: the length of the total lens system during imaging (the front surface S1 of the first lens group to the image plane) is 34.59 mm (wide-angle end)—30.77 mm (middle)—32.46 mm (telescopic end); the total dimension along the optical axis for the lens groups (thickness of the first lens group I+thickness of the second lens group II) is 11.63 mm; the back focus (air conversion) is 9.78 mm (wide-angle end)—14.53 mm (middle)—19.28 mm (telescopic end); the F number is 3.25 (wide-angle end)—4.42 (middle)—5.60 (telescopic end); and distortion is |5%| or less. Various types of aberrations are corrected effectively and a thin, compact zoom lens with superior optical properties suited for imaging elements with high pixel counts is provided.

Figure 21:
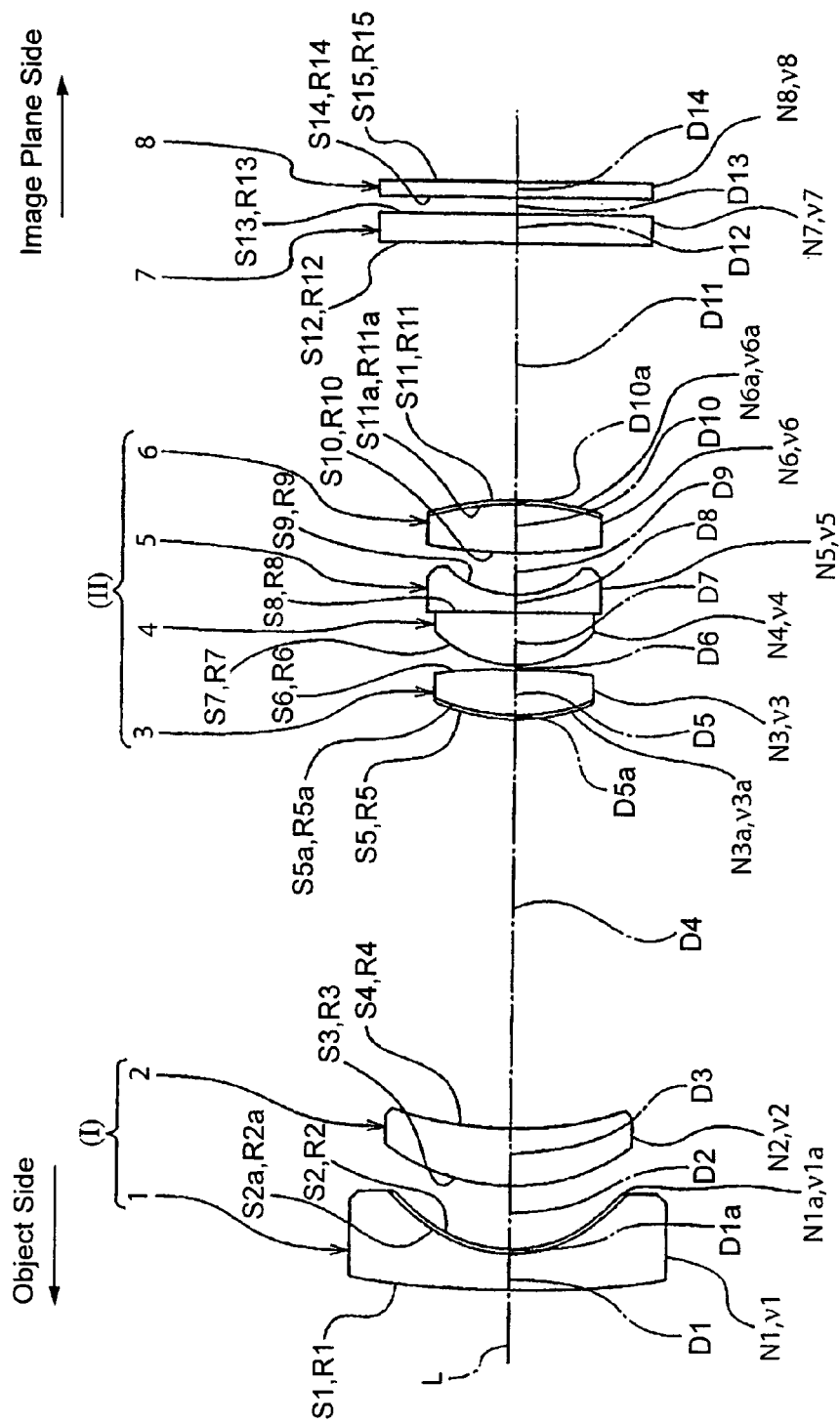
FIG. 21 is a drawing showing the structure of a sixth embodiment of a zoom lens according to the present invention.

FIG. 21 shows the basic structure of yet another embodiment of a zoom lens according to the present invention. The structure is identical to that of the embodiment shown in FIG. 5 (second embodiment) except making the third lens and the sixth lens 6 as hybrid lenses. Since the structure combines the embodiment shown in FIG. 13 (fourth embodiment) and the embodiment shown in FIG. 17 (fifth embodiment) with the embodiment shown in FIG. 5 (second embodiment), the description of the structure will be omitted.

An embodiments where specific numerical values are used for the above structure will be described below in the form of sixth embodiment. For the sixth embodiment, the various specifications are shown in Table 21, the various numerical data (settings) are shown in Table 22, and numerical data relating to aspherical surfaces are shown in Table 23. Table 24 shows the focal length f respectively, fw, fm, ft of the overall lens system for the wide-angle end, the middle position, and the telescopic end and numerical data for the surface distances D4, D11 along the optical axis L.

In the sixth embodiment, the numerical data for condition (1) through condition (9) are as follows: (1) f2/|f1|=0.825; (2) |f1|/fw=1.851; (3) v4=64.2>v5=33.3; (4) R7/R9=1.136; (5) v1−v2=16.9; (6) D2/fw=0.313; (7) |R2a/R2|=1.231; (8) |R5a/R5|=1.00; and (9) |R11a/R11|=1.00.

Figure 22:
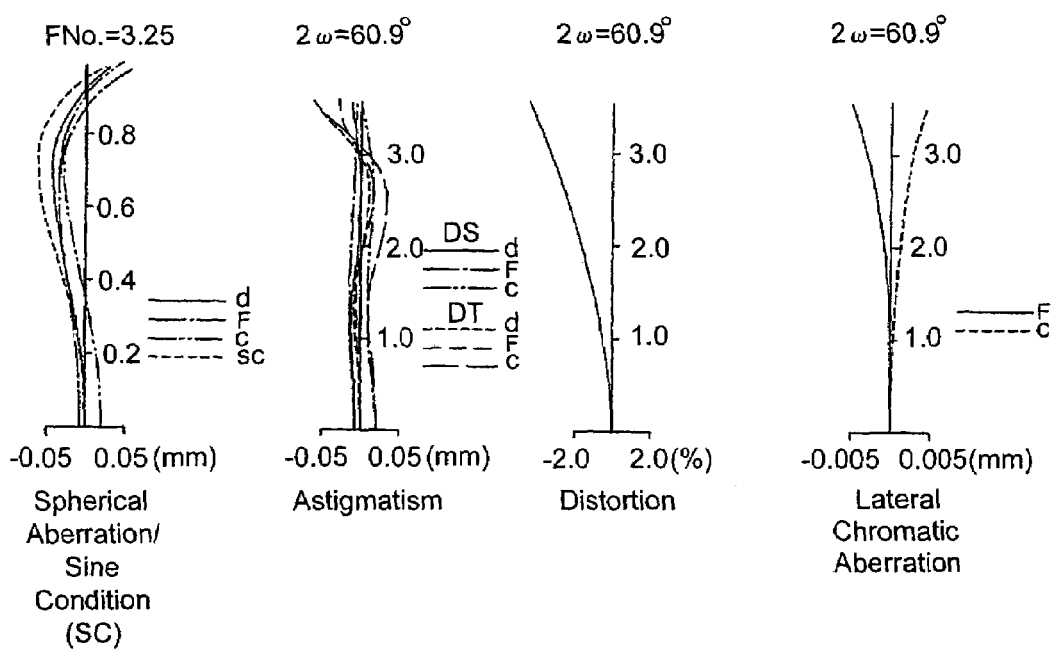
FIG. 22 shows aberration diagrams for spherical aberration, astigmatism, distortion, and lateral chromatic aberration at the wide-angle end of a zoom lens according to the sixth embodiment.
Figure 23:
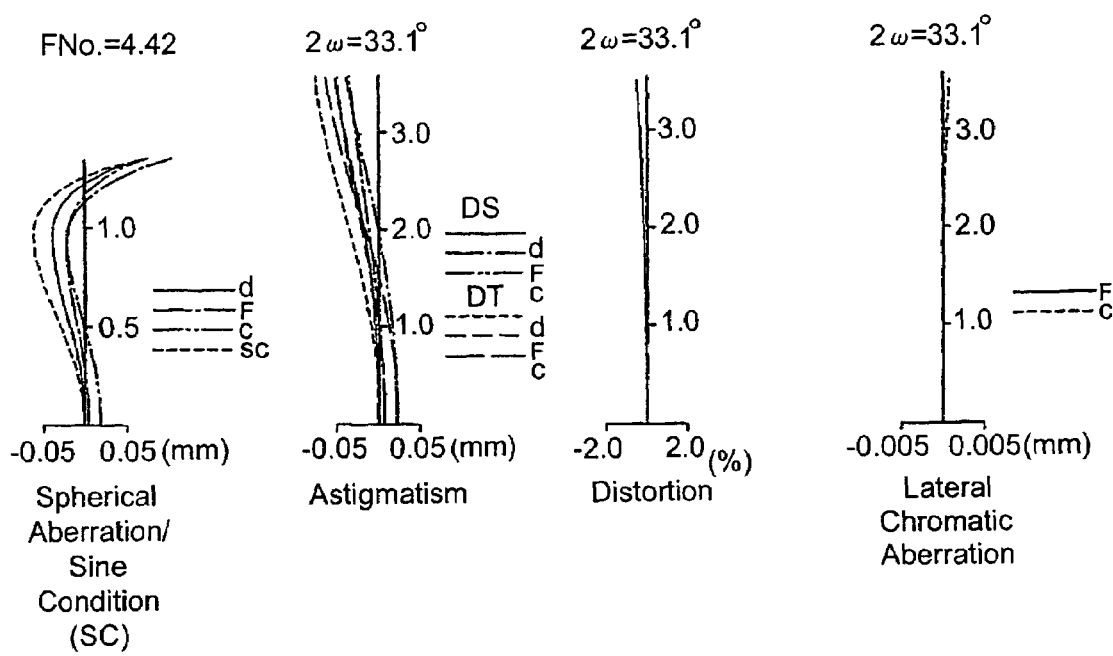
FIG. 23 shows aberration diagrams for spherical aberration, astigmatism, distortion, and lateral chromatic aberration at the middle position of a zoom lens according to the sixth embodiment.
Figure 24:
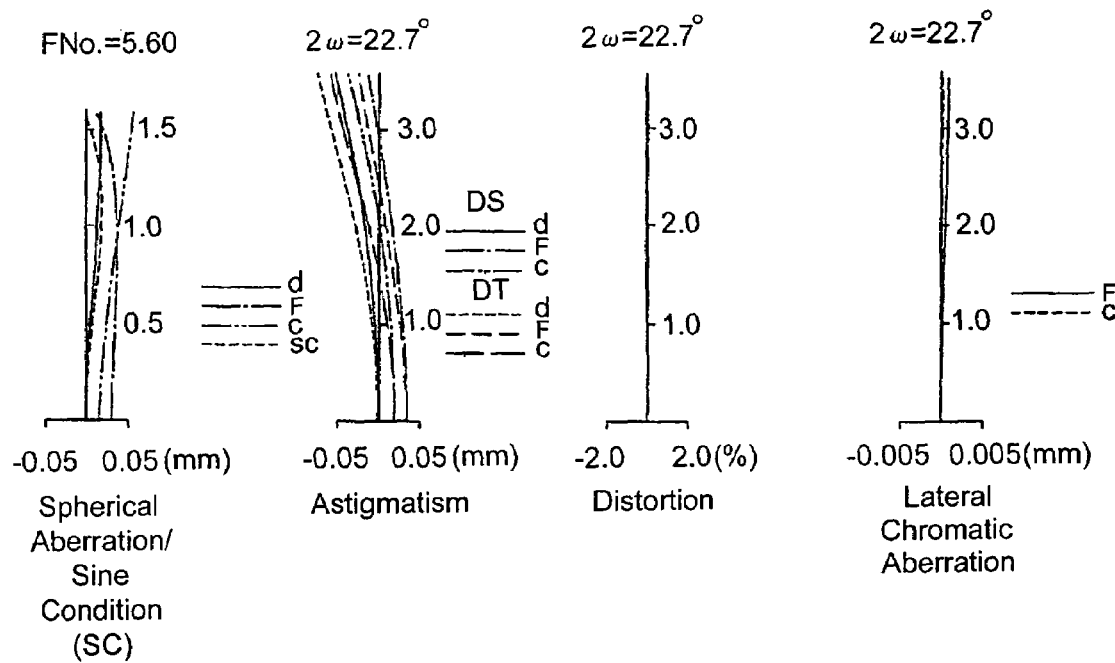
FIG. 24 shows aberration diagrams for spherical aberration, astigmatism, distortion, and lateral chromatic aberration at the telescopic end of a zoom lens according to the sixth embodiment.

Aberration diagrams for spherical aberration, astigmatism, distortion, and lateral chromatic aberration for the wide-angle end, the middle position, and the telescopic end are as shown in FIG. 22, FIG. 23, and FIG. 24. In FIG. 22 through FIG. 24, the aberration at the line d is indicated by d, the aberration at line F is indicated by F, the aberration at line c is indicated by c. SC indicates offense against the sine condition, DS indicates sagittal plane aberration, and DT indicates meridional plane aberration.

TABLE 21

| Object Distance (mm) | Infinity (∞) | Thickness of Second Lens Group II (mm) | 6.68 |
|---|---|---|---|
| Focal Length (mm) | 6.40~12.16~17.92 | Total Thickness of Lens Groups (mm) | 11.63 |
| F Number | 3.25~4.42~5.60 | Back Focus (Air Conversion) (mm) | 9.78~14.53~19.28 |
| Exit Pupil Position (mm) | −15.01~−19.75~−24.50 | Field Angle (2 ω) | 60.9°~33.1°~22.7° |
| Exit Angle of Outermost Light Ray | 12.1°~11.1°~8.9° | Focal Length f1 (mm) | −11.848 |
| Total Length of Lens (mm) | 24.33~15.77~12.71 | Focal Length f2 (mm) | 9.769 |
| Total Length of Lens System (mm) | 34.59~30.77~32.46 | Focal Length fw at Wide-Angle End (mm) | 6.400 |
| Thickness of First Lens Group I (mm) | 4.95 | | |

TABLE 22

| Surface | Curvature Radius (mm) | | Distance (mm) | Index of Refraction (line d) | | Abbe Number |
|---|---|---|---|---|---|---|
| S1 | R1 | 31.133 | | | | |
| | | | D1 1.200 | N1 1.80610 | v1 | 40.7 |
| S2a | R2a | 5.220 | | | | |
| | | | D1a 0.050 | N1a 1.51313 | v1a | 53.9 |
| S2* | R2 | 4.239 | | | | |
| | | | D2 2.000 | | | |
| S3 | R3 | 7.404 | | | | |
| | | | D3 1.700 | N2 1.84666 | v2 | 23.8 |
| S4 | R4 | 13.163 | | | | |
| | | | D4 Variable | | | |
| S5* | R5 | 7.642 | | | | |
| | | | D5a 0.050 | N3a 1.51313 | v3a | 53.9 |
| S5a | R5a | 7.642 | | | | |
| | | | D5 1.450 | N3 1.51680 | v3 | 64.2 |
| S6 | R6 | −23.402 | | | | |
| | | | D6 0.150 | | | |

TABLE 22-continued

| Surface | Curvature Radius (mm) | | Distance (mm) | Index of Refraction (line d) | | Abbe Number |
|---|---|---|---|---|---|---|
| S7 | R7 | 4.105 | | | | |
| | | | D7 1.600 | N4 1.51680 | v4 | 64.2 |
| S8 | R8 | 45.000 | | | | |
| | | | D8 0.630 | N5 1.80610 | v5 | 33.3 |
| S9 | R9 | 3.612 | | | | |
| | | | D9 1.300 | | | |
| S10 | R10 | 17.409 | | | | |
| | | | D10 1.450 | N6 1.51680 | v6 | 64.2 |
| S11a | R11a | −12.771 | | | | |
| | | | D10a 0.050 | N6a 1.51313 | v6a | 53.9 |
| S11* | R11 | −12.771 | | | | |
| | | | D11 Variable | | | |
| S12 | ∞ | | | | | |
| | | | D12 0.900 | N7 1.51680 | v7 | 64.2 |
| S13 | ∞ | | | | | |
| | | | D13 0.500 | | | |
| S14 | ∞ | | | | | |
| | | | D14 0.500 | N8 1.51680 | v8 | 64.2 |
| S15 | ∞ | | | | | |
| | | | BF 0.500 | | | |

*Aspherical surface

TABLE 23

| Surface | Aspherical Surface Coefficient | Numerical Data |
|---|---|---|
| S2 | ε | 0.2248000 |
| | D | 0.1938790 × 10$^{-3}$ |

TABLE 23-continued

| Surface | Aspherical Surface Coefficient | Numerical Data |
|---|---|---|
| | E | $0.3071690 \times 10^{-5}$ |
| | F | $-0.2910730 \times 10^{-6}$ |
| | G | $-0.2641060 \times 10^{-10}$ |
| | H | $-0.2450000 \times 10^{-9}$ |
| S5 | $\epsilon$ | 1.0000000 |
| | D | $-0.3255306 \times 10^{-3}$ |
| | E | $-0.7113555 \times 10^{-5}$ |
| | F | $-0.2522561 \times 10^{-6}$ |
| | G | $-0.6992022 \times 10^{-8}$ |
| | H | 0.0 |
| S11 | $\epsilon$ | 1.0000000 |
| | D | $0.1000000 \times 10^{-3}$ |
| | E | $0.1480948 \times 10^{-5}$ |
| | F | $0.3706728 \times 10^{-7}$ |
| | G | $0.5400299 \times 10^{-9}$ |
| | H | 0.0 |

TABLE 24

| | Wide-Angle End | Middle Position | Telescopic End |
|---|---|---|---|
| f (mm) | 6.40 (fw) | 12.16 (fm) | 17.92 (ft) |
| D4 (mm) | 12.700 | 4.135 | 1.076 |
| D11 (mm) | 7.861 | 12.609 | 17.358 |

In the sixth embodiment described above: the total length of the lens system during imaging (the front surface SI of the first lens group to the image plane) is 34.59 mm (wide-angle end)—30.77 mm (middle)—32.46 mm (telescopic end); the total dimension along the optical axis for the lens groups (thickness of the first lens group I+thickness of the second lens group II) is 11.63 mm; the back focus (air conversion) is 9.78 mm (wide-angle end)—14.53 mm (middle)—19.28 mm (telescopic end); the F number is 3.25 (wide-angle end)—4.42 (middle)—5.60 (telescopic end); and distortion is |5% | or less. Various types of aberrations are corrected effectively and a thin, compact zoom lens with superior optical properties suited for imaging elements with high pixel counts is provided.

In the embodiments described above, the first lens 1, the third lens 3, and the sixth lens 6 were formed with aspherical surfaces. However, even if aspherical surfaces are not used, a compact and thin design with a smaller total length when stored can be provided with a structure including a first lens group I with a negative refractive power and a second lens group II with a positive refractive power, wherein: the first lens group I is formed from a first lens 1 with a negative refractive power and a second lens 2 with a positive refractive power; the second lens group II is formed from a third lens 3 with a positive refractive power, a bonded lens with a negative refractive power (a fourth lens 4 and a fifth lens 5), and a sixth lens 6 with a positive refractive power.

The zoom lens according to the present invention as described above allows a compact, thin design while maintaining desired optical properties, thus makes it especially useful for digital still cameras and video cameras and the like that use solid-state imaging elements with high pixel counts.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A zoom lens comprising, in sequence from an object side to an image plane side:

a first lens group having an overall negative refractive power, and a second lens group having an overall positive refractive power;

wherein a zoom factor is changed from a wide-angle end to a telescopic end by moving said second lens group from said image plane side to said object side;

wherein focal adjustment is performed by moving said first lens group to correct changes in said image plane accompanied by changes in said zoom factor;

wherein said first lens group comprises, in sequence from said object side:

a first lens having a negative refractive power, and a second lens having a positive refractive power; and wherein said second lens group comprises, in sequence from said object side:

a third lens having a positive refractive power, a fourth lens, having a meniscus shape, a convex surface facing the object side, adjacent the third lens and a positive refractive power, a fifth lens, having is a meniscus shape, a convex surface facing the object side, and a negative refractive power, said fourth lens and said fifth lens being bonded and having an overall negative refractive power, and a sixth lens, biconvex, adjacent the fifth lens having a positive refractive power.

2. A zoom lens as described in claim 1 wherein:

$$0.5 < f2/|f1| < 1.3,$$

$$1.25 < |f1|/fw < 2.5,$$

where f1 is a focal length of said first lens group, f2 is a focal length of said second lens group, and fw is the focal length of an entire lens system at said wide-angle end.

3. A zoom lens as described in claim 1 wherein:

$$v4 > v5, \text{ and}$$

$$1.0 < R7/R9 < 3.0,$$

where v4 is an Abbe number of said fourth lens, v5 is an Abbe number of said fifth lens, R7 is a curvature radius of an object-side surface of said fourth lens, and R9 is a curvature radius of an image plane side surface of said fifth lens.

4. A zoom lens as described in claim 1 wherein:

$$v1 - v2 > 10, \text{ and}$$

$$D2/fw > 0.2,$$

where v1 is an Abbe number of said first lens, v2 is an Abbe number of said second lens, D2 is a distance along an optical axis between said first lens and said second lens, and fw is the focal length of an entire lens system at said wide-angle end.

5. A zoom lens comprising, in sequence from an object side to an image plane side:

a first lens group having an overall negative refractive power, and a second lens group having an overall positive refractive power;

wherein a zoom factor is changed from a wide-angle end to a telescopic end by moving said second lens group from said image plane side to said object side;

wherein focal adjustment is performed by moving said first lens group to correct changes in said image plane accompanied by changes in said zoom factor;

wherein said first lens group comprises, in sequence from said object side;

a first lens formed with an aspherical surface on at least one of said object-side and said image plane side surfaces and having a negative refractive power, and a second lens having a positive refractive power; and wherein said second lens group comprises, in sequence from said object side;

a third lens formed with an aspherical surface on at least one of said object-side and said image plane side surfaces and having a positive refractive power, a fourth lens having a positive refractive power, a fifth lens having a negative refractive power, said fourth lens and said fifth lens being bonded to form a meniscus shape with a convex surface facing said object side and having an overall negative refractive power, and a sixth lens formed with an aspherical surface on at least one of said object-side and said image plane side surfaces and having a positive refractive power.

6. A zoom lens as described in claim 5 wherein said first lens has an aspherical surface on a surface with a smaller curvature radius.

7. A zoom lens as described in claim 6 wherein said aspherical surface on said first lens is shaped so that a negative refractive power decreases toward edge portions of said aspherical surface.

8. A zoom lens as described in claim 5 wherein said first lens is a hybrid lens formed by bonding a resin layer formed from a resin material to a glass lens with said aspherical surface being formed on said resin layer.

9. A zoom lens as described in claim 8 wherein said resin layer is bonded to a surface of said first lens with a smaller curvature radius.

10. A zoom lens as described in claim 9 wherein said aspherical surface formed on said resin layer is shaped so that a negative refractive power decreases toward edge portions of said aspherical surface.

11. A zoom lens as described in claim 8 wherein, in said first lens, $1<|R2a/R2|<1.5$, where $R2a$ is a curvature radius of said surface at which said glass lens and said resin layer are bonded, and $R2$ is a curvature radius of said surface on which said aspherical surface is formed.

12. A zoom lens as described in claim 5 wherein said third lens is a hybrid lens formed by bonding a resin layer formed from a resin material to a glass lens, with said aspherical surface being formed on said resin layer.

13. A zoom lens as described in claim 12 wherein said resin layeris bonded on a surface of said third lens with a smaller curvature radius.

14. A zoom lens as described in claim 13 wherein said aspherical surface formed on said resin layer is shaped so that a positive refractive power decreases toward edge portions of said aspherical surface.

15. A zoom lens as described in claim 12 wherein, in said third lens, $0.7<|R5a/R5|<2.0$, where $R5a$ is a curvature radius of a surface at which said glass lens and said resin layer are bonded, and $R5$ is a curvature radius of said surface on which said aspherical surface is formed.

16. A zoom lens as described in claim 5 wherein said sixth lens is a hybrid lens formed by bonding a resin layer formed from a resin material to a glass lens, wherein said aspherical surface is formed on said resin layer.

17. A zoom lens as described in claim 16 wherein said aspherical surface formed on said resin layer is shaped so that a positive refractive power decreases toward edge portions of said aspherical surface.

18. A zoom lens as described in claim 16 wherein, in said sixth lens, $0.5<|R11a/R11|<2.0$, where $R11a$ is a curvature radius of a surface at which said glass lens and said resin layer are bonded, and $R11$ is a curvature radius of said surface on which said aspherical surface is formed.

19. A zoom lens comprising, in sequence from an object side to an image plane side:

a first lens group having an overall negative refractive power, and a second Jens group having an overall positive refractive power;

wherein a zoom factor is changed from a wide-angle end to a telescopic end by moving said second lens group from said image plane side to said object side;

wherein focal adjustment is performed by moving said first lens group to correct changes in said image plane accompanied by changes in said zoom factor;

wherein said first lens group comprises, in sequence from said object side;

a first lens having a negative refractive power, and a second lens having a positive refractive power; and wherein said second lens group comprises, in sequence from said object side;

a third lens having a positive refractive power, a fourth lens having a positive refractive power and a concave surface on the image plane side, a fifth lens having a negative refractive power, said fourth lens and said fifth lens being bonded to form a meniscus shape with a convex surface facing said object side and having an overall negative refractive power, and a sixth lens having a positive refractive power.

* * * * *